US007328155B2

(12) United States Patent
Endo et al.

(10) Patent No.: US 7,328,155 B2
(45) Date of Patent: Feb. 5, 2008

(54) METHOD AND SYSTEM FOR SPEECH RECOGNITION USING GRAMMAR WEIGHTED BASED UPON LOCATION INFORMATION

(75) Inventors: Norikazu Endo, Cupertino, CA (US); Benjamin K. Reaves, Mountain View, CA (US); Ramon E. Prieto, Mountain View, CA (US); John R. Brookes, Belmont, CA (US)

(73) Assignee: Toyota InfoTechnology Center Co., Ltd., Tokyo (JP)

( * ) Notice: Subject to any disclaimer, the term of this patent is extended or adjusted under 35 U.S.C. 154(b) by 802 days.

(21) Appl. No.: 10/753,706

(22) Filed: Jan. 7, 2004

(65) Prior Publication Data

US 2005/0080632 A1    Apr. 14, 2005

Related U.S. Application Data

(63) Continuation-in-part of application No. 10/269,269, filed on Oct. 10, 2002, now Pat. No. 7,184,957.

(60) Provisional application No. 60/413,958, filed on Sep. 25, 2002.

(51) Int. Cl.
*G10L 15/00* (2006.01)
(52) U.S. Cl. ...................... 704/251; 704/257
(58) Field of Classification Search ................ 704/251, 704/257
See application file for complete search history.

(56) References Cited

U.S. PATENT DOCUMENTS 6,112,174 A * 8/2000 Wakisaka et al. ........... 704/251

| 6,144,989 | A | 11/2000 | Hodjat et al. |
| 6,324,513 | B1 | 11/2001 | Nagai et al. |
| 7,058,573 | B1 | 6/2006 | Murveit et al. |
| 2002/0072917 | A1 | 6/2002 | Irvin et al. |
| 2002/0111810 | A1 | 8/2002 | Khan et al. |
| 2002/0128837 | A1 | 9/2002 | Morin |
| 2002/0169611 | A1 | 11/2002 | Guerra et al. |
| 2003/0004717 | A1* | 1/2003 | Strom et al. ................ 704/240 |
| 2003/0036907 | A1 | 2/2003 | Stewart et al. |
| 2003/0105639 | A1 | 6/2003 | Naimpally et al. |
| 2003/0125869 | A1 | 7/2003 | Adams |
| 2003/0182054 | A1 | 9/2003 | Peterson et al. |

FOREIGN PATENT DOCUMENTS

| JP | 10-97285 A | 4/1998 |
| JP | P2000-181485 A | 6/2000 |

(Continued)

OTHER PUBLICATIONS

Written Opinion of the International Searching Authority dated Apr. 26, 2005 for International Application No. PCT/JP2005/000428.

*Primary Examiner*—Daniel Abebe
(74) *Attorney, Agent, or Firm*—Fenwick & West LLP

(57) ABSTRACT

A speech recognition method and system for use in a vehicle navigation system utilize grammar weighted based upon geographical information regarding the locations corresponding to the tokens in the grammars and/or the location of the vehicle for which the vehicle navigation system is used, in order to enhance the performance of speech recognition. The geographical information includes the distances between the vehicle location and the locations corresponding to the tokens, as well as the size, population, and popularity of the locations corresponding to the tokens.

12 Claims, 13 Drawing Sheets

FOREIGN PATENT DOCUMENTS

| | | |
|---|---|---|
| JP | P2001-14165 A | 1/2001 |
| JP | P2001-195087 A | 7/2001 |
| JP | 2002-318136 A | 10/2002 |
| JP | 2003-4470 A | 1/2003 |

\* cited by examiner

METHOD AND SYSTEM FOR SPEECH RECOGNITION USING GRAMMAR WEIGHTED BASED UPON LOCATION INFORMATION

CROSS-REFERENCE TO RELATED APPLICATIONS

This application is a continuation-in-part application of, and claims priority under 35 U.S.C. §120 from, U.S. patent application Ser. No. 10/269,269, entitled "Multiple Pass Speech Recognition Method and System," filed on Oct. 10, 2002, now U.S. Pat. No. 7,184,957 which claims priority under 35 U.S.C. §119(e) from U.S. Provisional Patent Application No. 60/413,958, entitled "Multiple Pass Speech Recognition Method and System," filed on Sep. 25, 2002, the subject matters of both of which are incorporated by reference herein in their entirety.

TECHNICAL FIELD

The present invention relates generally to speech recognition, and more specifically, to a multiple pass speech recognition method and system in which speech is processed by the speech recognition system multiple times for more efficient and accurate speech recognition, using grammar weighted based upon location information.

BACKGROUND OF THE INVENTION

Speech recognition systems have received increased attention lately and are becoming popular. Speech recognition technology is being used more and more in a wide range of technology areas ranging from security systems and automated response systems to a variety of electronic devices such as computers.

Conventional speech recognition systems are also used in car navigation systems as a command input device. Previously, users of car navigation systems typically entered the destination address and other control information into the car navigation system using text input devices such as a keyboard or a touch sensitive screen. However, these text input devices are inconvenient and dangerous to use when driving the car, since they require visual interaction with the driver and thus interfere with the driver's ability to drive. In contrast, speech recognition systems are more convenient and safer to use with car navigation systems, since they do not require visual interaction for the driver when commands are input to the car navigation system.

Conventional speech recognition systems typically attempted to recognize speech by processing the speech with the speech recognition system once and analyzing the entire speech based on a single pass. These conventional speech recognition systems had a disadvantage that they had a high error rate and frequently failed to recognize the speech or incorrectly recognized the speech. As such, car navigation systems using such conventional speech recognition systems would frequently fail to recognize the speech or incorrectly recognize the speech, leading to wrong locations or providing unexpected responses to the user. Furthermore, conventional speech recognition systems were not able to use information on the location of the vehicle in speech recognition of addresses, although using such location information in speech recognition may enhance the accuracy of speech recognition.

Therefore, there is a need for an enhanced speech recognition system that can recognize speech reliably and accurately. There is also a need for an enhanced speech recognition system that utilizes location information in speech recognition.

SUMMARY OF INVENTION

The present invention provides a multiple pass speech recognition method that includes at least a first pass and a second pass, according to an embodiment of the present invention. The multiple pass speech recognition method initially recognizes input speech using a speech recognizer to generate a first pass result. In one embodiment, the multiple pass speech recognition method determines the context of the speech based upon the first pass result and generates second pass grammar to be applied to the input speech in the second pass. The second pass grammar has a first portion set to match a first part of the input speech and a second portion configured to recognize a second part of the speech to generate a second pass result. In another embodiment of the present invention, the context of the speech in the first pass result may identify a particular level in a knowledge hierarchy. The second pass grammar will have a level in the knowledge hierarchy higher than the level of the first pass result.

In another embodiment of the present invention, the multiple pass speech recognition method of the present invention further includes a third pass, in addition to the first and second passes, and thus generates a third pass grammar limiting the second part of the speech to the second pass result and having a third pass model corresponding to the first part of the speech with variations within the second pass result. The multiple pass speech recognition method of the present invention applies the third pass grammar to the input speech by comparing the first part of the speech to the third pass model and limiting the second part of the speech to the second pass result. The third pass result is output as the final result of the multiple pass speech recognition method. In still another embodiment of the present invention, the third pass grammar and the third pass model may have a level in the knowledge hierarchy lower than both the level of the first pass result and the level of the second pass grammar.

The multiple pass speech recognition method provides a very accurate method of speech recognition, because the method recognizes speech multiple times in parts and thus the intelligence of the multiple pass speech recognition method is focused upon only a part of the speech at each pass of the multiple pass method. The multiple pass speech recognition method also has the advantage that the intelligence and analysis gathered in the previous pass can be utilized by subsequent passes of the multiple pass speech recognition method, to result in more accurate speech recognition results.

In another embodiment, the present invention utilizes weighted grammar for address recognition in a vehicle navigation system, where the weights for corresponding tokens (sub-grammars) of the grammar are calculated based upon geographical information regarding the locations corresponding to the grammars. The weights may also be calculated based upon the current location of the vehicle as well as the geographical information regarding locations corresponding to the grammars. Using such a weighted grammar enhances the performance of speech recognition on addresses. The geographical information may include distances between the vehicle location and locations corresponding to the grammars, and where each of the weights associated with each token of the grammar varies inversely with the distance between the vehicle location and the location corresponding to the grammar. The geographical information may include the sizes of locations corresponding to the tokens of the grammars, the populations at the locations corresponding to the tokens of the grammars, or the popularity of the locations corresponding to the tokens of the grammars. Each of the weights associated with each token of the grammar may be proportional to the size, population, or popularity of the location corresponding to each token of the grammar.

The grammar generator calculates the weights based upon such geographical information and the vehicle location, and provides the grammars and their associated weights to the speech recognition engine. In another embodiment, the weights can be pre-calculated for various combinations of vehicle locations and locations corresponding to the tokens of the grammars and pre-stored, and later on selected along with their corresponding tokens of the grammars based upon the current vehicle location. The speech recognition engine performs speech recognition on input speech based upon the weighted grammars, and generates confidence scores corresponding to the grammars. The confidence scores are then modified based upon the associated weights.

The multiple pass speech recognition method of the present invention can be embodied in software stored on a computer readable medium or hardware including logic circuitry. The hardware may be comprised of a stand-alone speech recognition system or a networked speech recognition system having a server and a client device. Intelligence of the networked speech recognition system may be divided between the server and the client device in any manner.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

Figure 1:
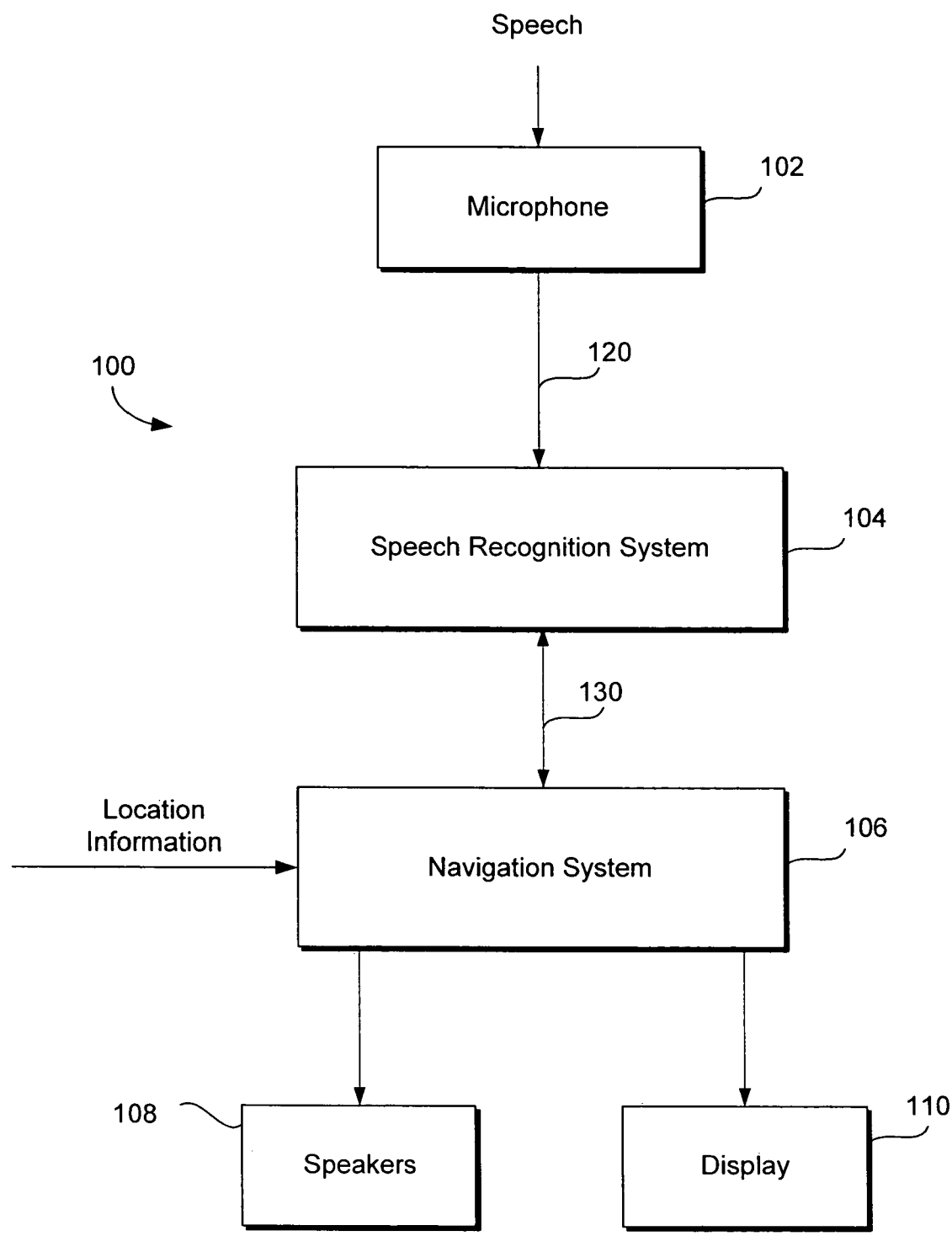
FIG. 1 is a block diagram illustrating a system using a speech recognition system according to one embodiment of the present invention.

The embodiments of the present invention will be described below with reference to the accompanying drawings. Like reference numerals are used for like elements in the accompanying drawings.

FIG. 1 is a block diagram illustrating a system 100 according to an embodiment of the present invention. This embodiment of the system 100 preferably includes a microphone 102, a speech recognition system 104, a navigation system 106, speakers 108 and a display device 110. The system 100 uses the speech recognition system 104 as an input device for the vehicle navigation system 106. FIG. 1 shows an example of how the speech recognition system of the present invention can be used with vehicle navigation systems. However, it should be clear to one skilled in the art that the multiple pass speech recognition system and method of the present invention can be used independently or in combination with any type of device and that its use is not limited to vehicle navigation systems.

Referring to FIG. 1, the microphone 102 receives speech commands from a user (not shown) and converts the speech to an input speech signal and passes the input speech signal to the speech recognition system 104 according to an embodiment of the present invention. The speech recognition system 104 is a multiple pass speech recognition system in which the input speech signal is analyzed multiple times in parts according to an embodiment of the present invention. Various embodiments of the multiple pass speech recognition method will be explained in detail below with reference to FIGS. 3 and 4A-4C.

The speech recognition system 104 is coupled to the vehicle navigation system 106 that receives the recognized speech as the input command. The speech recognition system 104 is capable of recognizing the input speech signal and converting the recognized speech to corresponding control signals for controlling the vehicle navigation system 106. The details of converting a speech recognized by the speech recognition system 104 to control signals for controlling the vehicle navigation system 106 are well known to one skilled in the art and a detailed description is not necessary for an understanding of the present invention. The vehicle navigation system 106 performs the commands received from the speech recognition system 104 and outputs the result on either the display 110 in the form of textual or graphical illustrations or the speakers 108 as sound. The navigation system 106 may also receive location information such as GPS (Global Positioning System) information and use the location information to show the current location of the vehicle on the display 100. The location information can also be used by the speech recognition system 104 to enhance the performance of the speech recognition system 104, as will be explained in detail below with reference to FIGS. 4B and 4C.

For example, the input speech signal entered to the speech recognition system 104 may be an analog signal from the microphone 102 that represents the phrase "Give me the directions to 10 University Avenue, Palo Alto." The speech recognition system 104 of the present invention analyzes the input speech signal and determines that the speech is an instruction to the navigation system 106 to give directions to 10 University Avenue, Palo Alto. The navigation system 106 uses conventional methods to process the instructions and gives the directions on the display 110 in the form of textual or graphical illustrations or on the speakers 108 as synthesized sound.

Figure 2A:
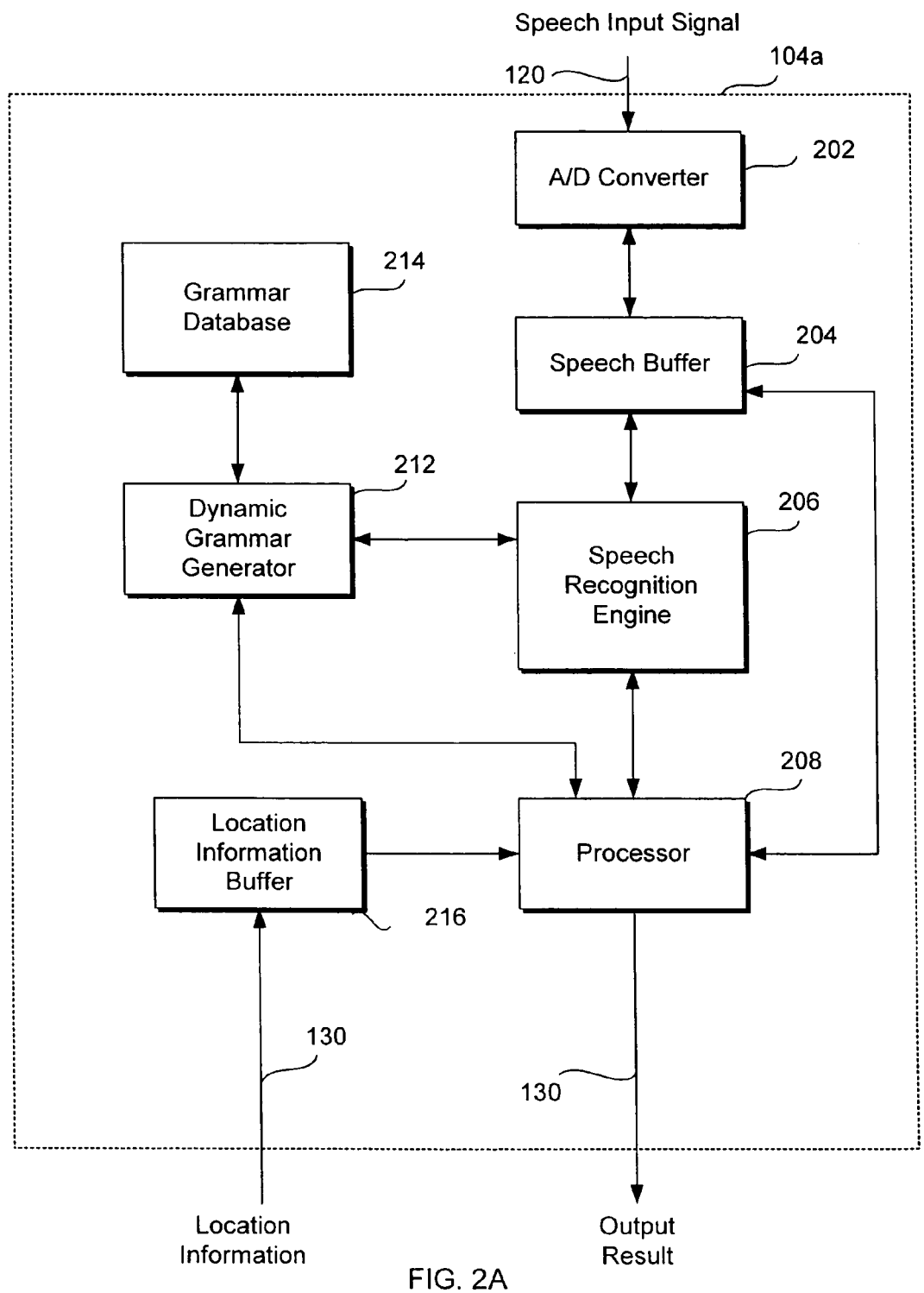
FIG. 2A is a block diagram illustrating a stand-alone speech recognition system according to a first embodiment of the present invention.

FIG. 2A is a block diagram illustrating a stand-alone speech recognition system 104a according to an embodiment of the present invention. In the embodiment illustrated in FIG. 2A, all of the functions and intelligence needed by the speech recognition system 104a reside in the speech recognition system 104a itself and, as such, there is no need to communicate with a server. For example, the speech recognition system 104a illustrated in FIG. 2A may be present in a car that is not networked to a server. All the speech recognition functions are carried out in the speech recognition system 104a itself.

Referring to FIG. 2A, the speech recognition system 104a includes an A/D (Analog-to-Digital) converter 202, a speech buffer 204, a speech recognition engine 206, a processor 208, a dynamic grammar generator 212, a grammar database 214, and a location information buffer 216. The A/D converter 202 has an input that is coupled to and receives an input speech signal from an external source such as a microphone 120 via line 120 and converts the received input speech signal to digital form so that speech recognition can be performed. The speech buffer 204 temporarily stores the digital input speech signal while the speech recognition system 104a recognizes the received speech. The speech buffer 204 may be any type of rewritable memory, such as flash memory, dynamic random access memory (DRAM), or static random access memory (SRAM), or the like. The speech recognition engine 206 receives the stored digital input speech signal from speech buffer 204 and performs the multiple pass speech recognition method of the present invention on the speech in cooperation with the dynamic grammar generator 212 and the processor 208 to recognize the speech. The multiple pass speech recognition method of the present invention will be illustrated in detail with reference to FIGS. 3 and 4A-4C below.

The grammar database 214 stores various grammars (or models) and associated information such as map information for use by the dynamic grammar generator 212 and the speech recognition engine 206 in the multiple pass speech recognition method of the present invention. The grammar database 214 can be stored in any type of storage device, such as hard disks, flash memories, DRAMs, or SRAMs, and the like.

The dynamic grammar generator 212 retrieves and/or generates the appropriate grammar (model) for use in the speech recognition engine 206 in accordance with the various stages (passes) of the multiple pass speech recognition method of the present invention. The dynamic grammar generator 212 can be any type of logic circuitry or processor capable of retrieving, generating, or synthesizing the appropriate grammar (model) for use in the corresponding stages of the multiple pass speech recognition method of the present invention. The dynamic grammar generator 212 is coupled to the speech recognition engine 206 to provide the appropriate grammar in each pass of the multiple pass speech recognition method of the present invention to the speech recognition engine 206. The dynamic grammar generator 212 is also coupled to the processor 208 so that it can receive control signals for generating the appropriate grammar in each pass of the multiple pass speech recognition method from the processor 208.

The processor 208 operates in cooperation with the speech recognition engine 206 to perform the multiple pass speech recognition method of the present invention on the input speech signal and outputs the final result of the speech recognition. For example, the processor 208 may weigh the speech recognition results output from the speech recognition engine 206 according to predetermined criteria and determine the most probable result to be output from the speech recognition system 104a. The processor 208 also controls the various operations of the components of the client device 104a, such as the A/D converter 202, the speech buffer 204, the speech recognition engine 206, the dynamic grammar generator 212, the grammar database 214, and the location information buffer 216.

In another embodiment of the present invention, the processor 208 may have the capabilities of segmenting only a part of the digital input speech signal stored in the speech buffer 204 and inputting only the segmented part to the speech recognition engine 206. In such case, the processor 208 also controls the dynamic grammar generator 212 to generate grammar that corresponds to only the segmented part of the speech.

The location information buffer 216 receives location information such as GPS information from an external source such as the navigation system 106 having a GPS sensor (not shown) via line 130 and stores the location information for use by the processor 208 in the multiple pass speech recognition method of the present invention. For example, the location information stored in the location information buffer 216 may be used by the processor 208 as one of the criteria in weighing the speech recognition results output from the speech recognition engine 206 and determining the most probable result(s) to be output from the speech recognition system 104a. The details of how the processor 208 weighs the speech recognition results output from the speech recognition engine 206 or how the location information stored in the location information buffer 208 is utilized by the processor 208 in weighing the speech recognition results will be explained in detail below with reference to FIGS. 3 and 4A-4C.

The speech recognition system 104a illustrated in FIG. 2A has the advantage that all the functions of the speech recognition system 104a reside in a self-contained unit. Thus, there is no need to communicate with other servers or databases in order to obtain certain data or information or perform certain functions of the multiple pass speech recognition method of the present invention. In other words, the speech recognition system 104a is a self-standing device and does not need to be networked with a server.

Figure 2B:
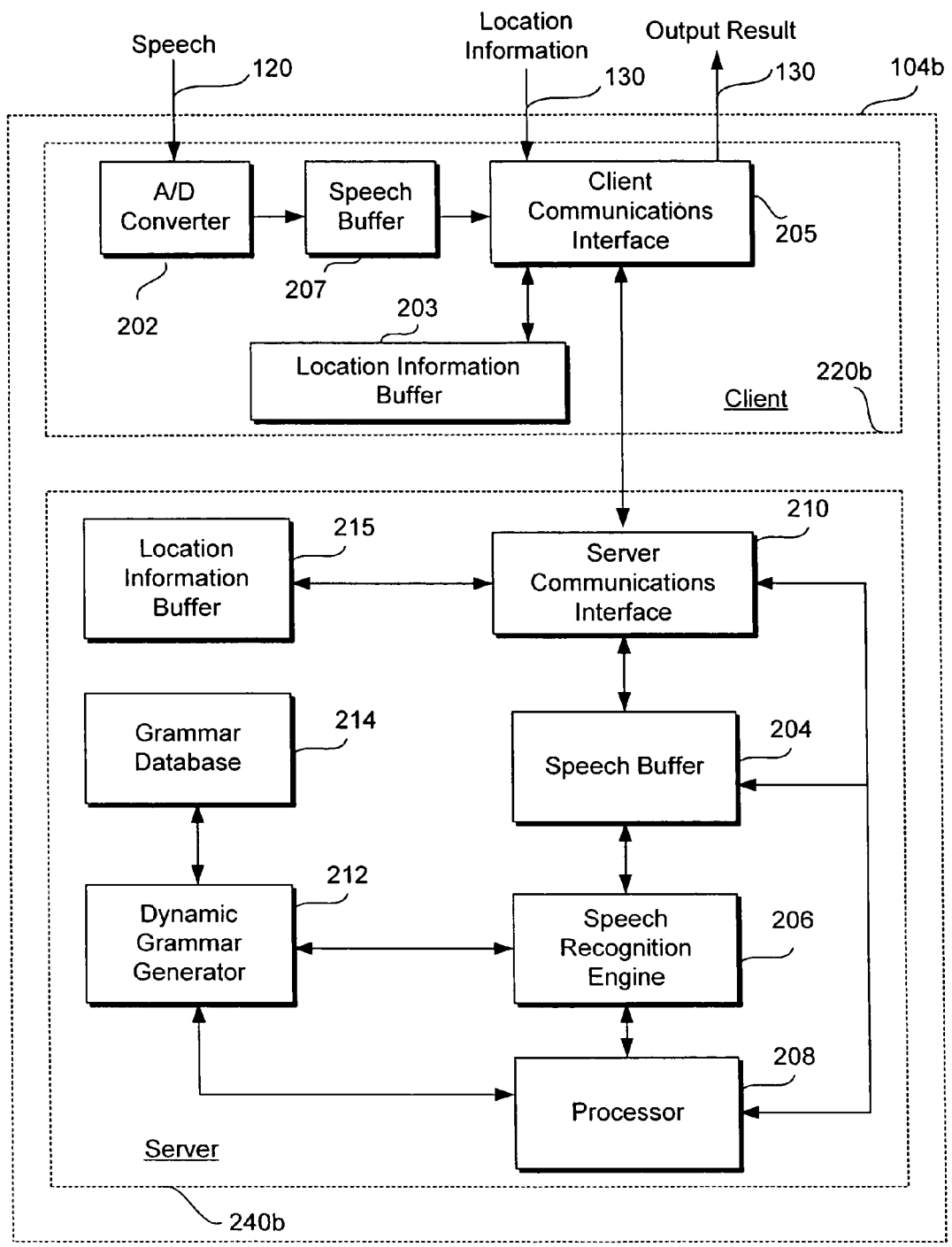
FIG. 2B is a block diagram illustrating a client device and a server in a networked speech recognition system according to a second embodiment of the present invention.

FIG. 2B is a block diagram illustrating a second embodiment of the networked speech recognition system 104b comprising a client device 220b and a server 240b. The speech recognition system 104b described in FIG. 2B is different from the speech recognition system 104a in FIG. 2A in that the speech recognition system 104b is distributed computationally between a client device 220b and a server 240b with most of the intelligence of the speech recognition system 104b residing in the server 240b. For example, the client device 220b can be a thin device located in a networked vehicle that merely receives an analog input speech signal from a driver via the microphone 102, and most of the multiple pass speech recognition method of the present invention is performed in the server 240b after receiving the speech information from the client device 220b.

Referring to FIG. 2B, the client device 220b includes an A/D converter 202, a speech buffer 207, a location information buffer 203, and a client communications interface 205. The A/D converter 202 receives an input speech signal from an external source such as a microphone 102 and converts the received input speech signal to digital form so that speech recognition can be performed. The speech buffer 207 temporarily stores the digital input speech signal while the speech recognition system 104b recognizes the speech. The speech buffer 207 may be any type of rewritable memory, such as flash memory, dynamic random access memory (DRAM), or static random access memory (SRAM), or the like. The location information buffer 203 receives location information such as GPS information received from the an external source such as the navigation system 106 including a GPS sensor (not shown) and stores the location information for use by the speech recognition system 104b in the multiple pass speech recognition method of the present invention.

The client communications interface 205 enables the client device 220b to communicate with the server 240b for distributed computation for the multiple pass speech recognition method of the present invention. The client communications interface 205 also enables the client device 220b to communicate with the navigation system 106 to output the speech recognition results to the navigation system 106 in the form of converted command signals and to receive various information such as location information from the navigation system 106. The client device 220b transmits the digital speech signal stored in the speech buffer 207 and the location information stored in the location information buffer 203 to the server 240b via the client communications interface 205 to carry out the multiple pass speech recognition method of the present invention. The client device 220b also receives the result of the multiple pass speech recognition method of the present invention from the server 240b via the client communications interface 205. The client communications interface 205 is preferably a wireless communications interface, such as a cellular telephone interface or satellite communications interface. However, it should be clear to one skilled in the art that any type of communications interface can be used as the client communications interface 205.

The server 240b includes a server communications interface 210, a speech buffer 204, a speech recognition engine 206, a processor 208, a location information buffer 215, a grammar database 214, and a dynamic grammar generator 212. The server 240b receives the speech and/or location information from the client device 220b via the server communications interface 210 and carries out the multiple pass speech recognition method according to the present invention. Upon completion of the speech recognition, the server 240b transmits the result back to the client device 220b via the server communications interface 210. The server communications interface 210 is also preferably a Wireless communications interface, such as a cellular telephone interface or satellite communications interface. However, it should be clear to one skilled in the art that any type of communications interface can be used as the server communications interface 210.

The speech buffer 204 stores the speech received from the client device 220b while the server 240b performs the multiple pass speech recognition method of the present invention. The location information buffer 215 also stores the location information received from the client device 220b while the server 240b performs the multiple pass speech recognition method of the present invention. The speech recognition engine 206, the processor 208, the grammar database 214, and the dynamic grammar generator 212 perform the same functions as those components described with reference to FIG. 2A, except that they are located in the server 240b rather than in the client device 220b.

The speech recognition system 104b illustrated in FIG. 2B has the advantage that the client device 220b has a very simple hardware architecture and can be manufactured at a very low cost, since the client device 220b does not require complicated hardware having much intelligence and most of the intelligence for the multiple pass speech recognition method of the present invention reside in the server 240b. Thus, such client devices 220b are appropriate for low-end client devices used in networked speech recognition systems 104b. In addition, the speech recognition system 104b may be easily upgraded by upgrading only the components in the server 240b, since most of the intelligence of the speech recognition system 104b resides in the server 240b.

Figure 2C:
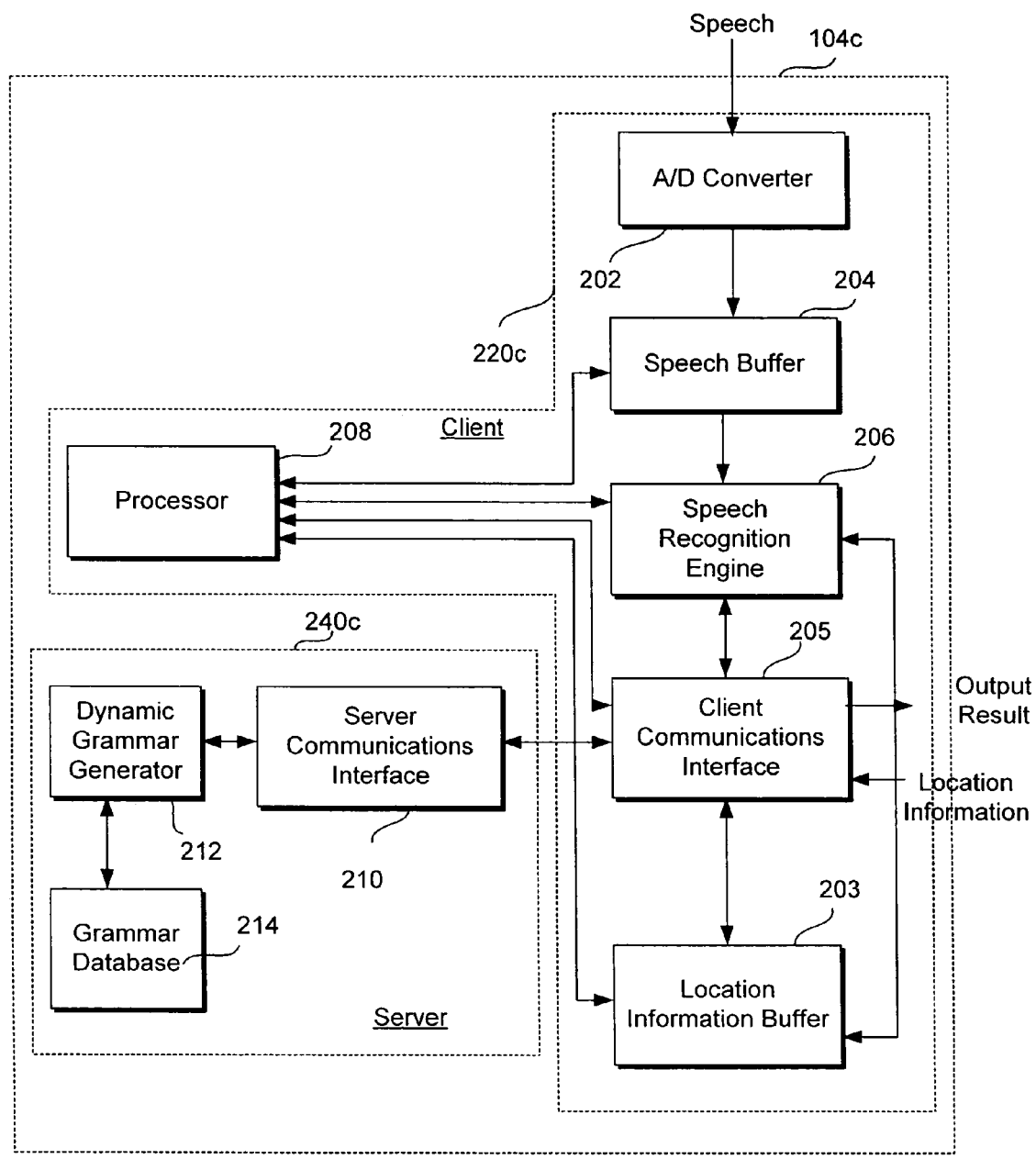
FIG. 2C is a block diagram illustrating a client device and a server in a networked speech recognition system according to a third embodiment of the present invention.

FIG. 2C is a block diagram illustrating a speech recognition system 104c comprising a client device 220c and a server 240c according to still another embodiment of the present invention. The speech recognition system 104c described in FIG. 2C is different from the speech recognition systems 104a and 104b illustrated in FIGS. 2A and 2B, respectively, in that the speech recognition system 104c is a networked system having a client device 220c and a server 240c and that the intelligence of the speech recognition system 104 is divided between the client device 220c and the server 240c. For example, the client device 220c may be located in a networked vehicle that receives an input speech signal from a driver via a microphone 102 and performs part of the functions of the multiple pass speech recognition method of the present invention, and the server 240c may perform the remaining parts of the functions of the multiple pass speech recognition method of the present invention. It should be clear to one skilled in the art that the manner in which the intelligence of the networked speech recognition system 104c is divided between the client device 220c and the server 240c can be modified in a number of different ways.

Referring to FIG. 2C, the client device 220c includes an A/D converter 202, a speech buffer 204, a speech recognition engine 206, a location information buffer 203, and a client communications interface 205. The A/D converter 202 receives an input speech signal from an external source such as a microphone 102 and converts the received speech to digital form so that speech recognition can be performed. The speech buffer 204 stores the digital speech signal while the speech recognition system 104c recognizes the speech. The speech buffer 204 may be any type of rewritable memory, such as flash memory, dynamic random access memory (DRAM), or static random access memory (SRAM), or the like. The location information buffer 203 receives location information such as GPS information from an external source such as a navigation system 106 including a GPS sensor (not shown) via the client communications interface 205 and stores the location information for use by the speech recognition system 104c in the multiple pass speech recognition method of the present invention.

The speech recognition engine 206, the location information buffer 203, and the processor 208 perform the same functions as those components described with respect to FIG. 2A except that they operate in conjunction with a grammar database 214 and a dynamic grammar generator 212 located in a server 240c rather than in the client device 220c itself. The client communications interface 205 enables the client device 220c to communicate with the server 240c.

The client device 220c communicates with the server 240c via the client communications interface 205 in order to request the server 240c to generate or retrieve the appropriate grammar at various stages of the multiple pass speech recognition method and receive such generated grammar from the server 240c. The client communications interface 205 is preferably a wireless communications interface, such as a cellular telephone interface or satellite communications interface. However, it should be clear to one skilled in the art that any type of communications interface can be used as the client communications interface 205.

The server 240c includes a server communications interface 210, a grammar database 214, and a dynamic grammar generator 212. The server 240c receives a request to retrieve or generate appropriate grammar at various stages (passes) of the multiple pass speech recognition method of the present invention and transmits such retrieved or generated grammar from the server 240c to the client device 220c via the server communications interface 210. The dynamic grammar generator 212 and the grammar database 214 perform the same functions as those components described with respect to FIG. 2A except that they are located in a server 240c rather than in the client device 220c itself and operate in conjunction with the client device 220c via the server communications interface 210.

In the embodiment illustrated in FIG. 2C, the grammar database 214 and the dynamic grammar generator 212 are located in the server 240c rather than in individual client devices 220 to reduce the costs of manufacturing the speech recognition system 104c, since grammar information requires a lot of data storage space and thus results in high costs for manufacturing the client devices or makes it impractical to include in low-end client devices. Furthermore, the intelligence in the speech recognition system 104c of the present invention can be divided between the server 240c and the client devices 220c in many different ways depending upon the allocated manufacturing cost of the client devices. Thus, the speech recognition system 104 of the present invention provides flexibility in design and cost management. In addition, the grammar database 214 or the dynamic grammar generator can be easily upgraded, since they reside in the server 240c.

Figure 3:
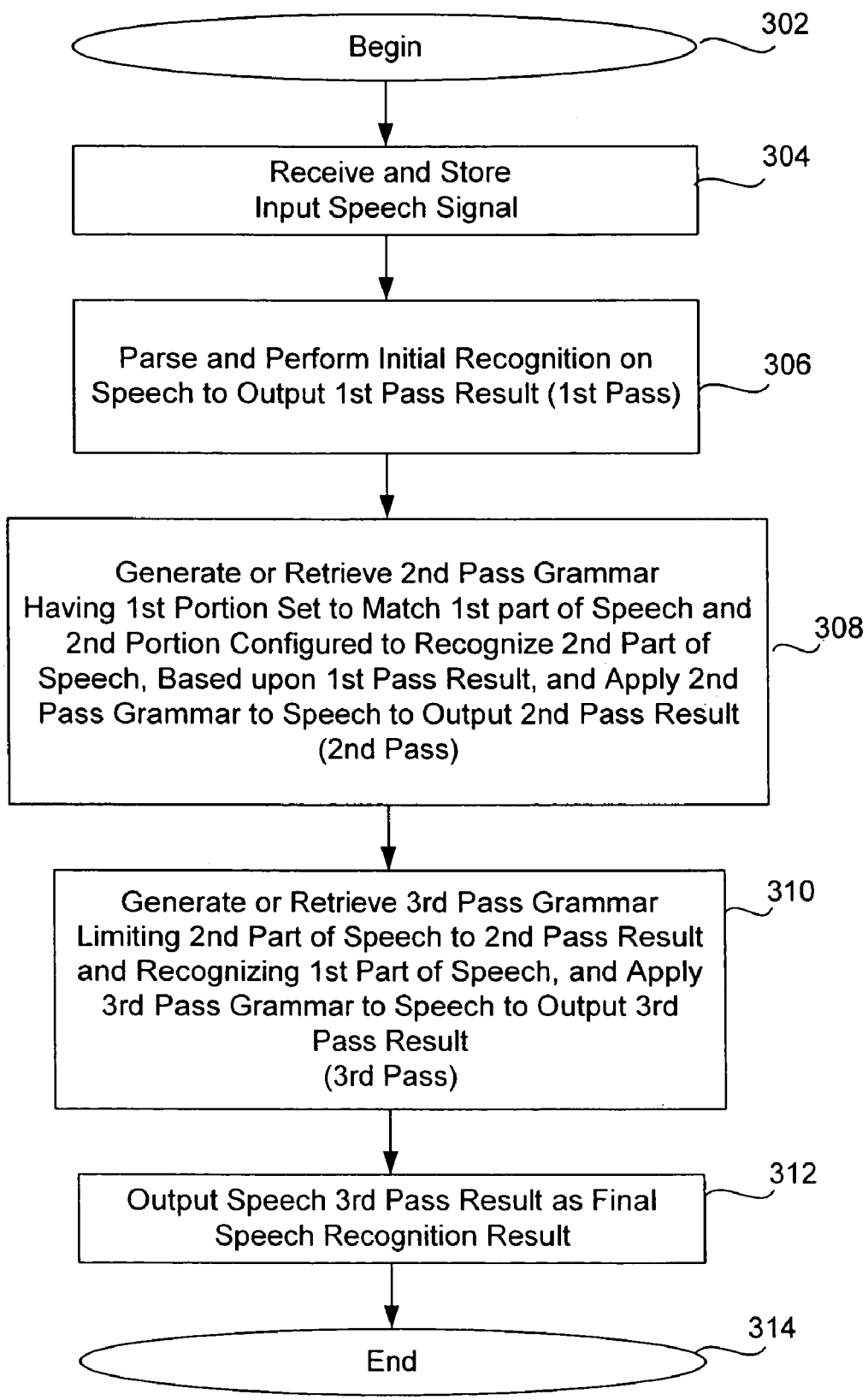
FIG. 3 is a flowchart illustrating a multiple pass speech recognition method according to one embodiment of the present invention.

FIG. 3 is a flowchart illustrating a multiple pass speech recognition method according to an embodiment of the present invention. As the process begins 302, the speech recognition system 104 receives and stores 304 an input speech signal from an external source such as a microphone 102. The A/D converter 202 and the speech buffer 204 receive and store the input speech signal. Step 302 is typically carried out in client devices if the speech recognition system 104 is a networked speech recognition system. The speech is parsed 306 into a few parts and initial speech recognition is performed 306 using a conventional speech recognizer. The parsed speech will have a recognized text and be correlated to certain time points of the input speech signal waveform. Step 306 is referred to as the first pass of the multiple pass speech recognition method according to the present invention. The conventional speech recognizer (not shown) may be any state-of-the-art speech recognizer known in the art, and its functions are performed by the combined operation of the speech recognition engine 206, the processor 208, the dynamic grammar generator 212, and the grammar database 214 in the present invention. The operations of a conventional speech recognizer are well known to one skilled in the art and a detailed explanation of the operations of a conventional speech recognizer is not necessary for an understanding of the present invention.

The speech parsed and recognized in step 306 is output 306 as the first pass result of the multiple pass speech recognition method according to the present invention. The first pass result is an initial result of speech recognition and is used as a model to generate or retrieve appropriate grammar in the second pass of the multiple pass speech recognition method of the present invention, which will be explained in more detail with reference to FIGS. 4A and 4B.

The first pass result is used by the dynamic grammar generator 212 to generate or retrieve 308 appropriate grammar to be applied 308 to the speech in the second pass 308 of the multiple pass speech recognition method of the present invention. The grammar for the second pass has a first portion set to match a first part of the speech and a second portion configured to recognize a remaining second part of the speech using a conventional speech recognizer. The second pass grammar is retrieved or generated by the dynamic grammar generator 212 using the grammar or information stored in the grammar database 214. The second pass grammar thus generated or retrieved is applied to the stored input speech signal by the speech recognition engine 206 in cooperation with the processor 208. The details of generating or retrieving the grammar for the second pass and application of such grammar to the speech will be explained in more detail with reference to FIG. 4B below. The result of the second pass is output 308 for use in generating or retrieving appropriate grammar for the third pass of the multiple pass speech recognition method of the present invention.

The dynamic grammar generator 212 generates or retrieves 310 appropriate grammar for use in the third pass of the multiple pass speech recognition method of the present invention, based upon the second pass result. The third pass grammar limits the second part of the speech to the second pass result, and attempts to recognize the first part of the speech. The third pass grammar is retrieved or generated by the dynamic grammar generator 212 as well, using the grammar or information stored in the grammar database 214. The third pass grammar thus generated or retrieved is applied to the speech by the speech recognition engine 206 in cooperation with the processor 208. The details of generating or retrieving the third pass grammar and application of such grammar to the speech will be explained in more detail with reference to FIG. 4C below. The third pass result is output 312 as the final speech recognition result and the process ends 314.

Figure 4A:
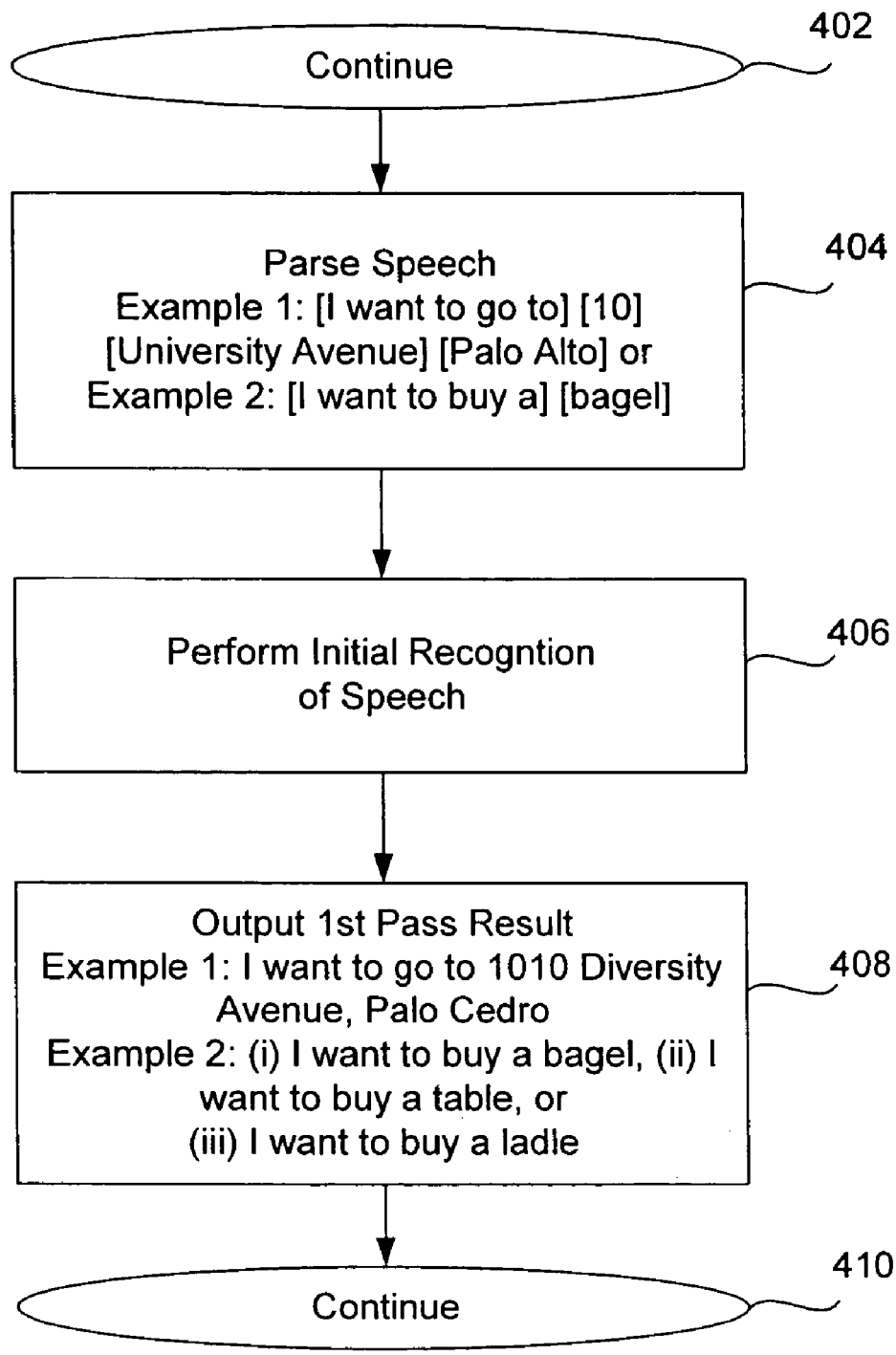
FIG. 4A is a flowchart illustrating in more detail the first pass of the multiple pass speech recognition method according to one embodiment of the present invention.

FIG. 4A is a flowchart illustrating in more detail the first pass 306 of the multiple pass speech recognition method according to an embodiment of the present invention. The flow charts of FIGS. 4A-4C use two examples in which the speech received for recognition is "I want to go to 10 University Avenue, Palo Alto" (the first example) or "I want to buy a bagel" (the second example) in order to demonstrate how the multiple pass speech recognition system of the present invention processes and analyzes the speech.

As the process continues 402 after the input speech signal is received and stored 302, the input speech signal is parsed 404 into several parts based upon analysis of the sound of the speech using a conventional speech recognizer. Typically, sounds of human speech contain short silence between words, phrases, or clauses, so that a conventional speech recognizer can discern such silence and parse the speech. For example, the speech of "I want to go to 10 University Avenue, Palo Alto" in the first example can be parsed into four parts [I want to go to], [10], [University Avenue], and

[Palo Alto]. Likewise, the speech of "I want to buy a bagel" in the second example can be parsed into two parts [I want to buy a], [bagel].

Then, initial recognition of the parsed speech is performed 406, using a conventional speech recognizer and outputs 408 the result as the first pass result. The result may include one or more initial recognitions. Conventional speech recognizers typically have a high error rate in speech recognition. Thus, the first pass results of the initial speech recognition 406 are typically a close but inaccurate result. For example, the first pass result for the first example may be an inaccurate result such as "I want to go to 1010 Diversity Avenue, Palo Cedro" as the speech recognition result for the input speech "I want to go to 10 University Avenue, Palo Alto." The first pass result for the second example may include three estimates, such as "I want to buy a bagel," "I want to buy a table," and "I want to buy a ladle" as the speech recognition result for the input speech "I want to buy bagel."

The details of parsing and recognizing speech using a conventional speech recognizer as described above is well known in the art and a detailed explanation of parsing and recognizing speech is not necessary for un understanding of the present invention. Conventional speech recognizers also provide defined points of starting and stopping a sound waveform corresponding to the parsing. The parsing and speech recognition functions of the conventional speech recognizer may be performed by the speech recognition engine 206 in cooperation with the processor 208 of the present invention.

Figure 4B:
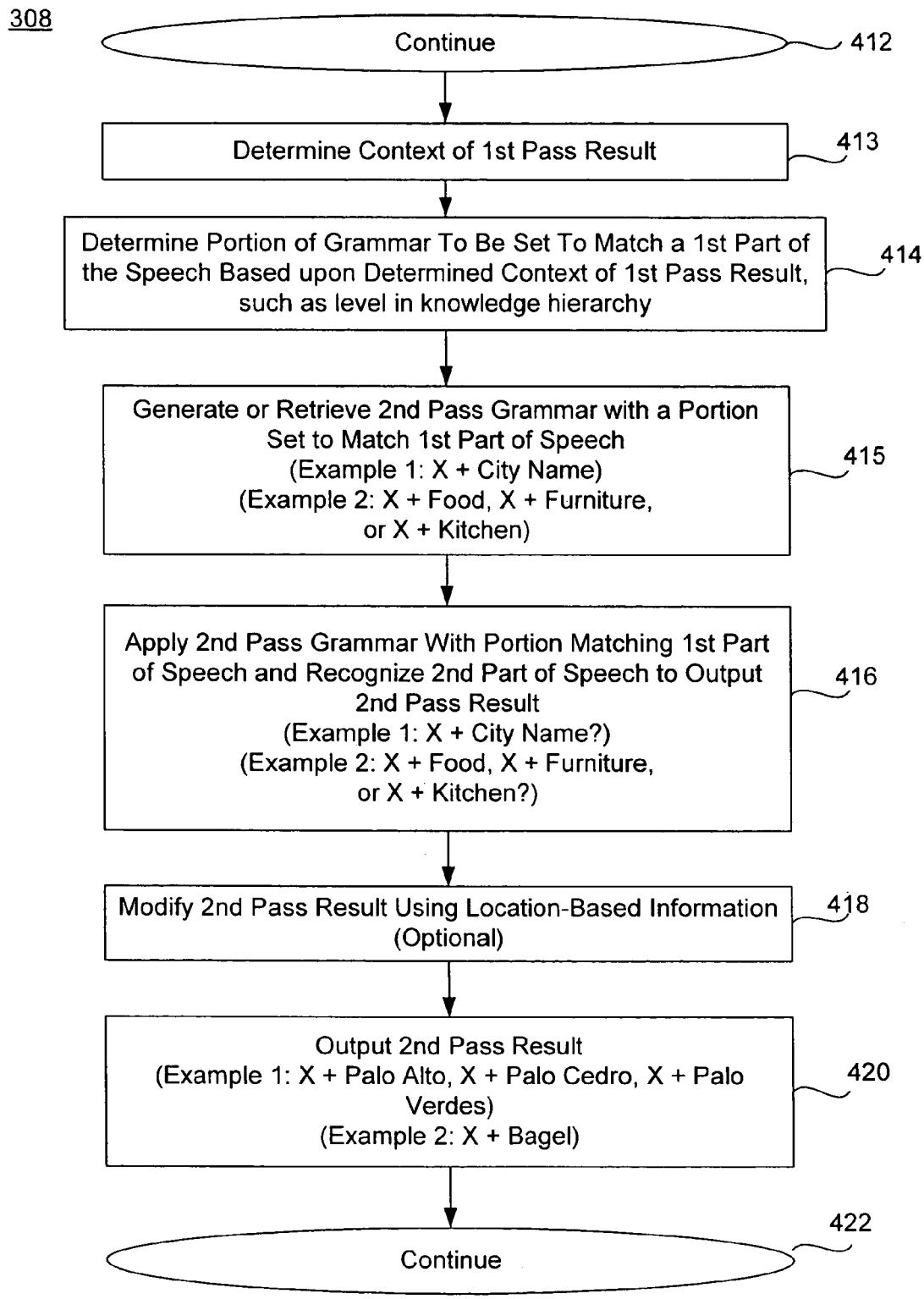
FIG. 4B is a flowchart illustrating in more detail the second pass of the multiple pass speech recognition method according to one embodiment of the present invention.

FIG. 4B is a flowchart illustrating in more detail the second pass 308 of the multiple pass speech recognition method according to an embodiment of the present invention. The second pass receives the first pass result to generate or retrieve appropriate grammar for the second pass and applies the second pass grammar to the speech.

Referring to FIG. 4B, as the process continues 412, the dynamic grammar generator 212 determines 413 the context of the speech recognized in the first pass. The dynamic grammar generator 212 determines 414 a portion of the grammar to be set to match a first part of the input speech based upon the determined context of the first pass result. Then, the dynamic grammar generator 212 generates or retrieves 415 the second pass grammar having the portion set to match the first part of the input speech and attempting to recognize a second part of the input speech.

Such determination of the context of the recognized speech in step 413 and using such determination to determine a portion of the grammar to be set to match a first part of the speech in step 414 may be done based upon pre-existing knowledge about speeches, such as ontological knowledge or information on knowledge hierarchy. For example, the dynamic grammar generator 212 can determine that the first pass result "I want to go to 1010 Diversity Avenue, Palo Cedro" for the first example is a speech asking for directions to a location with a particular address. Typically, statements asking for directions have a phrase such as "I want to go to," "Give me the directions to," "Where is," or "Take me to" at the beginning of such statements, followed by a street number, street name, and city name. Also, since geographical information is typically hierarchical, it is more efficient for the speech recognition system to recognize the word at the top of the hierarchy first (e.g., city name in the example herein). Thus, the dynamic grammar generator 212 will use pre-existing knowledge about such statements asking for directions to generate appropriate grammar for the second pass according to one embodiment of the present invention. Specifically with respect to the example herein, the dynamic grammar generator 212 generates 415 or retrieves 415 from the grammar database 214 grammar (speech models) having a portion set to match the "I want to go to 1010 Diversity Avenue" part of the first pass result and attempting to recognize the remaining part of the speech in order to determine the proper city name (in the form of "X (unknown or don't care)+city name"). In one embodiment, the remaining part of the speech is recognized by comparing such remaining part to a list of cities stored in the grammar database 214.

As to the second example, the dynamic grammar generator 212 analyzes the first pass result "I want to buy a bagel," "I want to buy a table," and "I want to buy a ladle" and determines that the context of the first pass result is food, furniture, or kitchen. That is, the dynamic grammar generator determines the level of the context of the first pass result in a knowledge hierarchy already stored in the grammar database 214 and also determines a category of grammar higher in the knowledge hierarchy than the determined context of the first pass result. As a result, the dynamic grammar generator 212 generates second pass grammar in the categories of food, furniture, and kitchen for application to the speech in the second pass, since food, furniture, and kitchen are categories higher in the knowledge hierarchy than bagel, table, and ladle respectively. Specifically, the second pass grammar for the second example will have a portion set to exactly match the "I want to buy a" part of the speech and attempt to recognize the remaining part of the speech in the food, furniture, or kitchen category. In one embodiment, the remaining part of the speech may be recognized by comparing such remaining part with various words in the food, furniture, or kitchen category.

Then, the speech recognition engine 206 applies 416 the second pass grammar to the speech to recognize 416 the second part of the speech. In this step 416, the input to the speech recognition engine 206 is not limited to the first pass result, according to an embodiment of the present invention. Rather, the speech recognition engine 206 re-recognizes the input speech only as to the second part of the speech regardless of the first pass result, because the second pass grammar already has a portion set to match the first part of the speech.

In another embodiment, the processor 208 may segment only the second part of the speech and input only the segmented second part of the speech to the speech recognition engine 206 for the second pass. This may enhance the efficiency of the speech recognition system of the present invention. In such alternative embodiment, the second pass grammar also corresponds to only the segmented second part of the speech, i.e., the second pass grammar does not have a part corresponding to the first part of the speech.

In the second pass application 416 as to the first example, the speech recognition engine 206 focuses on recognizing only the city name and outputs a list of city names as the second pass recognition result of the present invention. For example, the second pass result output in step 416 for the first example may be in the form of: "X (unknown or don't care)+Palo Alto; "X (unknown or don't care)+Los Altos; "X (unknown or don't care)+Palo Cedros; and "X (unknown or don't care)+Palo Verdes." These four results may be selected by outputting the results having a probability assigned by the speech recognizer above a predetermined probability threshold. It should be clear to one skilled in the art that any number of results may be output as the second pass result depending upon the probability threshold.

In the second pass application 416 as to the second example, the speech recognition engine 206 focuses on recognizing only the object name in the food, furniture, or kitchen category and outputs a list of object names as the second pass recognition result of the present invention. For example, the second pass result output in step 416 for the first example may be in the form of: X (unknown or don't care)+bagel; and "X (unknown or don't care)+table."

The second pass result may also be modified 418 using location-based information input to the processor 208 in the speech recognition system 104, and the modified second pass result is output 420 for use in the third pass of the multiple pass speech recognition method of the present invention. For example, the processor 208 may use GPS information to determine the distance between the current location of the speech recognition system in the vehicle and the city (first example) or store that sell the objects (second example) in the second pass result, and use such distance information to change the weight given to the probabilities of each result output by the second pass or to eliminate certain second pass results. Specifically, the processor 208 may determine that the current location of the vehicle is so far from Los Altos and eliminate Los Altos from the second pass result for the first example, because it is unlikely that the user is asking for directions to a specific address in Los Altos from a location very distant from Los Altos. Similarly, the processor 208 may determine that the current location of the vehicle (e.g., a vacation area) is so unrelated to tables and eliminate table from the second pass result for the second example, because it is unlikely that the user is asking for directions to a location for buying furniture in a vacation area. It should be clear to one skilled in the art that the location-based information may be used in a variety of ways in modifying the second pass results and the example described herein does not limit the manner in which such location-based information can be used in the speech recognition system of the present invention. It should also be clear to one skilled in the art that other types of information such as the user's home address, habits, preferences, and the like may also be stored in memory in the speech recognition system of the present invention and used to modify the second pass results. Further, step 418 is an optional step such that the second pass result may be output 420 without modification 418 based upon the location-based information.

Figure 4C:
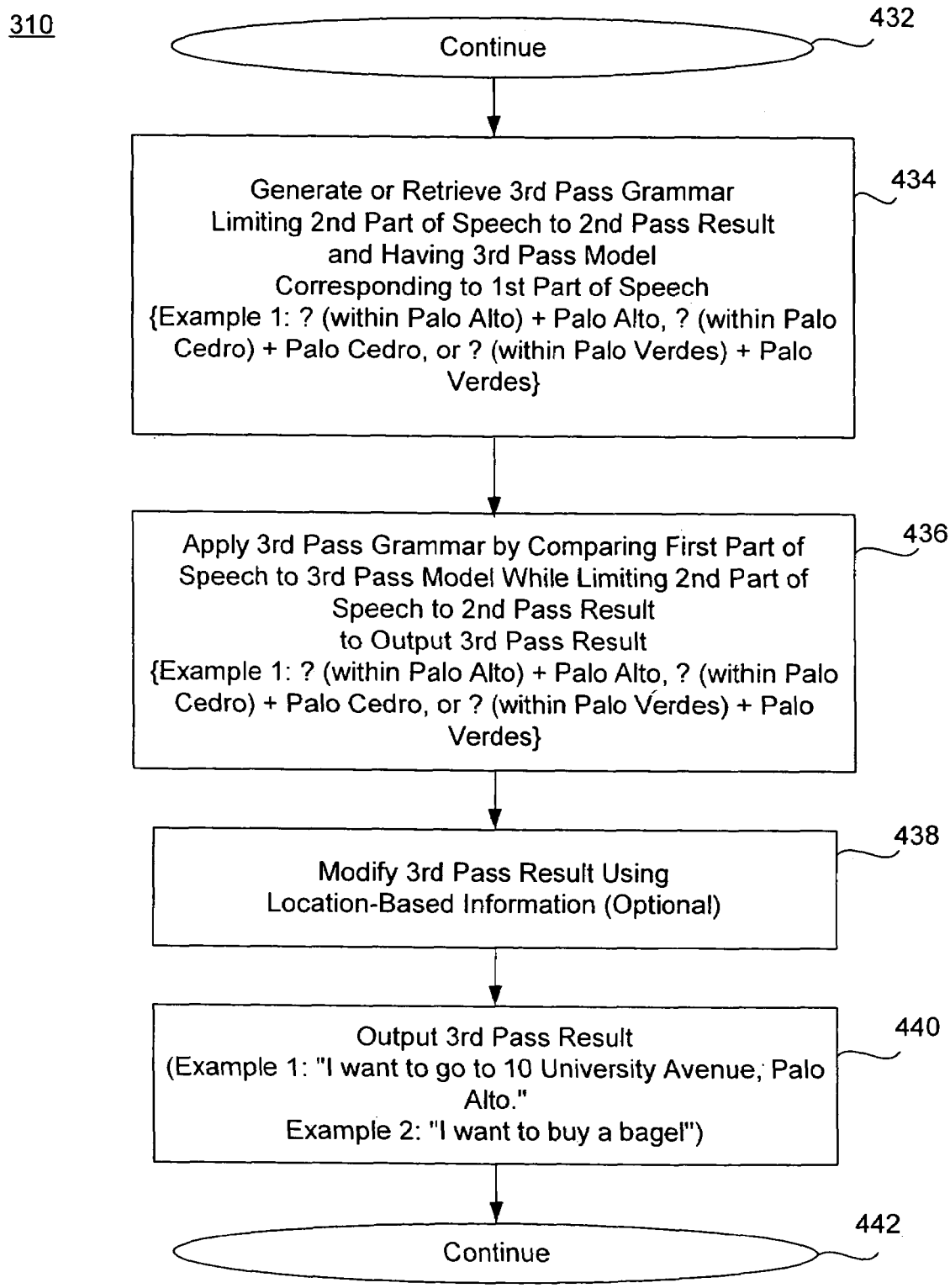
FIG. 4C is a flowchart illustrating in more detail the third pass of the multiple pass speech recognition method according to one embodiment of the present invention.

FIG. 4C is a flowchart illustrating in more detail the third pass 310 of the multiple pass speech recognition method according to an embodiment of the present invention. Referring to FIG. 4C, the third pass receives the second pass result to generate or retrieve 434 appropriate grammar for the third pass. The third pass grammar limits the second part of the speech to the second pass results and has a third pass model corresponding to the first part of the speech. The third pass model is configured to vary only within the second pass result and corresponds to a level lower in the knowledge hierarchy than the second pass result and the second pass grammar. For example, the third pass grammar limits the city names in the first example herein to the second pass result (e.g., Palo Alto, Palo Cedro, and Palo Verdes in the first example) and the third pass model varies the respective street numbers and street names in the first part of the speech among the street numbers and street names located within such cities determined in the second pass. The second example does not have a level lower in the knowledge hierarchy than the second pass result "bagel," and thus does need a third pass grammar. The third pass grammar is generated or retrieved from the grammar database 214 by the dynamic grammar generator 212. In an alternative embodiment, the processor 208 may also segment only the first part of the speech and input only this segmented first part of the speech to the speech recognition engine 206 for comparison with the third pass model in the third pass. This may enhance the efficiency of the speech recognition system of the present invention. In such alternative embodiment, the third pass grammar also corresponds to only the first part of the speech, i.e., the third pass grammar does not have a part corresponding to second the part of the speech.

Once the third pass grammar is generated or retrieved 434, it is applied 436 to the speech by the speech recognition engine 206 in cooperation with the processor 208 in order to recognize the first part of the speech. Application 436 of the third pass grammar to the speech is done by comparing the first part of the speech to the third pass model of the third pass grammar while limiting the second part of the speech to the second pass results. For example, the first part of the speech ("I want to go to 10 University Avenue" or "X" above in the first example) is compared with the sound (third pass model) corresponding to a list of street numbers and street names (e.g., University Avenue, Diversity Avenue, Main Avenue, etc.) located within the cities (Palo Alto, Palo Cedro, and Palo Verdes) determined in the second pass. Since the number of street addresses in the third pass grammar is limited to the street addresses located within a few cities determined in the second pass, speech recognition techniques that are more accurate but require more processing speed may be used in order to recognize the street address. Therefore, the multiple pass speech recognition method of the present invention is more accurate and effective in speech recognition than conventional speech recognition methods.

The third pass result output in step 436 may be one or more statements that the multiple pass speech recognition method of the present invention estimates the input speech to mean. For example, the third pass result may include two statements "I want to go to 10 University Avenue, Palo Alto" and "I want to go to 10 Diversity Avenue, Palo Alto." This third pass result may also be modified 438 using location-based information input to the processor 208 in the speech recognition system 104, and the modified third pass result is output 440 as the final result output by the multiple pass speech recognition method of the present invention. For example, the processor 208 may use GPS information to determine the distance between the current location of the speech recognition system 104 in the vehicles and the street address/city in the third pass result and use such distance information to change the weight given to the probabilities of each statement in the third pass results or to eliminate certain statements. Specifically, the processor 208 may determine that the current location of the vehicle is so far from 10 Diversity Avenue in Palo Alto and thus eliminate "I want to go to 10 Diversity Avenue, Palo Alto" from the third pass result, because it is unlikely that the user is asking for directions to such location having an address very distant from the current location of the vehicle. It should be clear to one skilled in the art that the location-based information may be used in a variety of ways in modifying the third pass results and the example described herein does not limit the manner in which such location-based information can be used in the speech recognition system of the present invention. It should also be clear to one skilled in the art that other types of information such as the user's home address, habits, preferences, and the like may also be stored in the speech recognition system of the present invention and used to modify the third pass results. Further, step 438 is an optional step and the third pass result may be output 440 without modification 438 based upon the location-based information. Finally, the process continues 442 to output 312 the third pass result "I want to go to 10 University Avenue Palo Alto" for the first example or "I want to buy bagel" for the second example as the final speech recognition result according to the multiple pass speech recognition system of the present invention. This final speech recognition result may also be converted to various control signals for inputting to other electronic devices, such as the navigation system 106.

Figure 5:
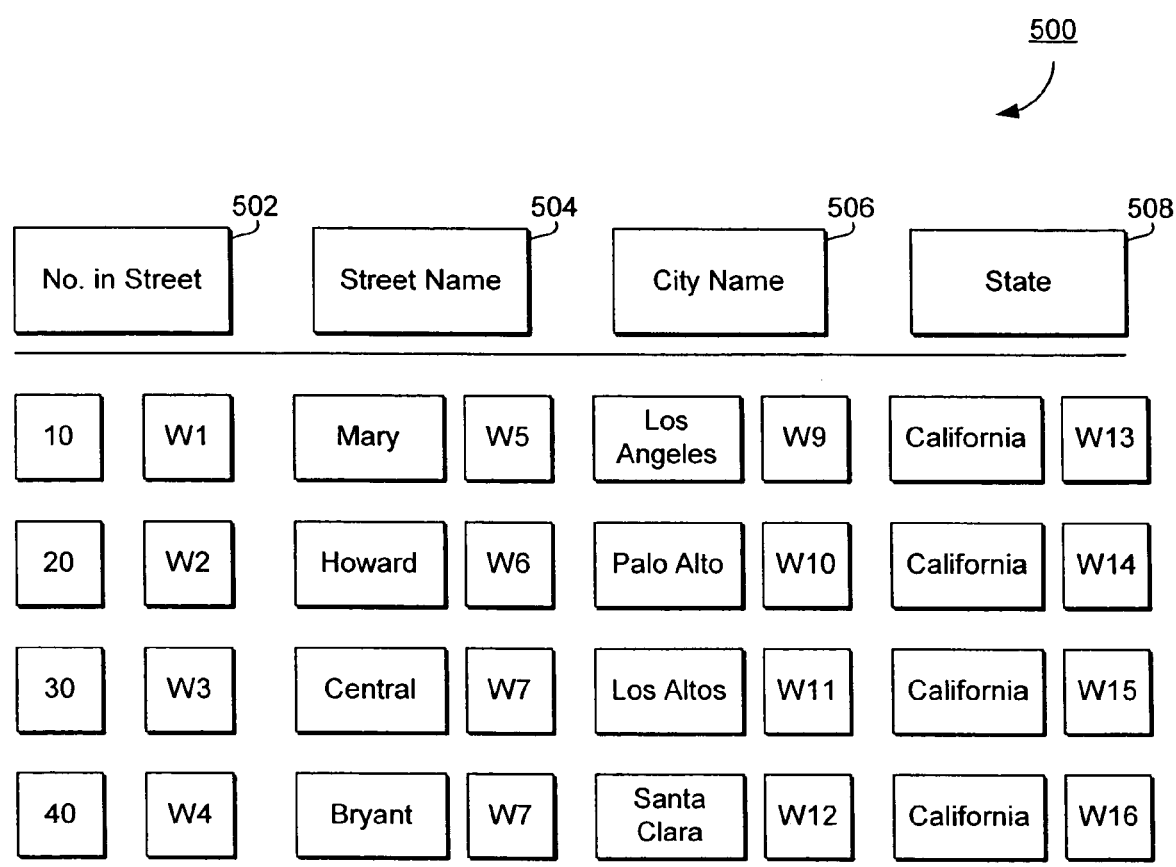
FIG. 5 is a diagram illustrating weighted grammar for the multiple pass speech recognition method, according to one embodiment of the present invention.

FIG. 5 is a diagram illustrating weighted grammar 500 for multiple pass speech recognition, according to one embodiment of the present invention. The grammar described in FIG. 5 is for recognizing addresses and is weighted based upon the current location of the vehicle and geographical information regarding the locations corresponding to the grammars, such as the distance from the current location to the location corresponding to the grammar, or the size, population, or popularity of the location corresponding to the grammar.

Referring to FIG. 5, the grammar 500 includes state name tokens 508, city name tokens 506, street name tokens 504, and street number tokens 502, each of which is weighted based upon the current location of the vehicle and geographical information regarding the locations corresponding to the grammars. For example, the city name tokens 506 includes "Los Angeles," "Palo Alto," "Los Altos," and "Santa Clara," each of which is weighted by weights W9, W10, W11, and W12, respectively. The street number tokens 502, the street name tokens 504, and the state name tokens 508 are weighted in a similar manner. The grammar 500 described in FIG. 5 is for performing speech recognition with at least five passes according to the multiple pass speech recognition method of the present invention, i.e., one pass for determining the context of the input speech and the remaining four passes for determining the state, city name, street name, and the number in the street. However, it should be noted that the weighted grammar of the present invention may be used with a speech recognition method of any number of passes, including a single pass speech recognition method.

The speech recognition engine (206) in each pass receives the relevant grammar and compares the input speech signal with the relevant grammar in each pass to output a confidence score corresponding to each of the grammar. For example, in order to determine the city name, the speech recognition engine acoustically compares the input speech signal with the city name tokens 506 "Los Angeles," "Palo Alto," "Los Altos," and "Santa Clara," and outputs confidence scores C1, C2, C3, C4 (not shown), respectively, corresponding to "Los Angeles," "Palo Alto," "Los Altos," and "Santa Clara," respectively. The speech recognition engine modifies the confidence scores C1, C2, C3, C4 by multiplying or otherwise combining the weights W9, W10, W11, W12, respectively, with the confidence scores C1, C2, C3, C4, respectively, and outputs the grammar with the highest modified confidence score as the final speech recognition result for the pass. The manner in which the weights W1 through W16 are calculated and the weights W1 through W16 modify the speech recognition results will be described in more detail with reference to FIGS. 6 and 7.

Figure 6:
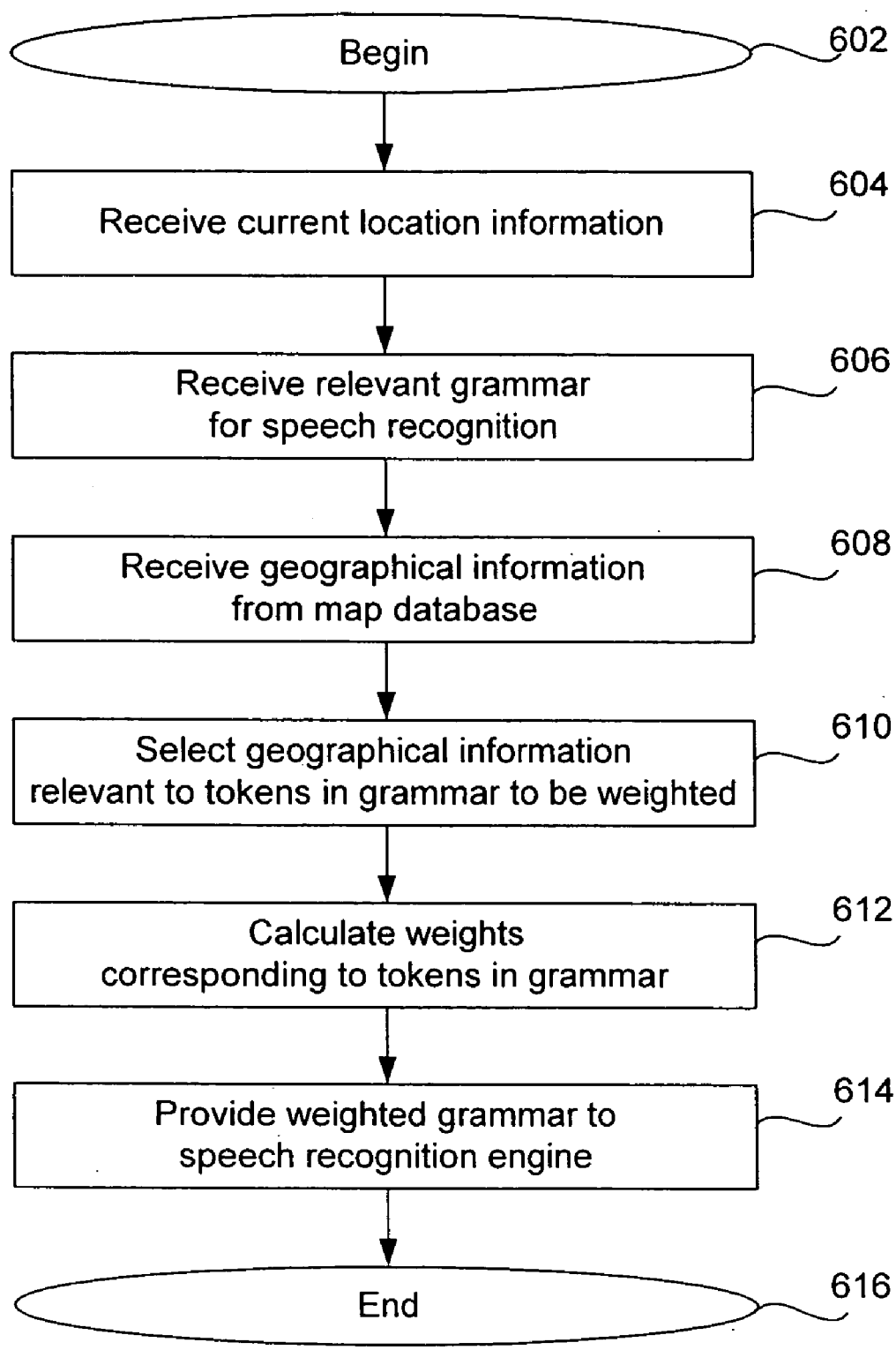
FIG. 6 is a flowchart illustrating a method of providing weighted grammar, according to one embodiment of the present invention.

FIG. 6 is a flowchart illustrating a method of providing weighted grammar, according to one embodiment of the present invention. In one embodiment, the method of FIG. 6 is carried out in a grammar generator 212 that provides the appropriate grammar to the speech recognition engine 206 in a speech recognition system 104 used with a vehicle navigation system 106, although the method may be carried out elsewhere, e.g., in a general purpose processor. The method of FIG. 6 describes a method of providing the weighted grammar for one of the passes in the multiple pass speech recognition method of the present invention. For convenience of illustration, the method of FIG. 6 will be described in the context of a speech recognition pass that determines the city name of an address. However, it should be noted that the method of FIG. 6 may be used with any pass of the multiple pass speech recognition method of the present invention or in a single pass for different weights.

Referring to FIG. 6, as the process begins 602, the grammar generator receives 604 information on the current location of the vehicle provided by, e.g., a GPS (Global Positioning System). For example, the current location (city) of the vehicle may be Mountain View, Calif. The grammar generator 212 also receives 606 the grammar relevant for the particular pass of the speech recognition. For example, the received grammar may include city name tokens "Los Angeles," "Palo Alto," "Los Altos," and "Santa Clara" for recognizing the city name as illustrated in FIG. 5, since this particular pass is for determination of city name.

The grammar generator also receives 608 geographical information from a geographical information database 802 (FIG. 8), which includes information such as the distance between various geographical locations, and the size, population, and popularity of the geographical locations. Then, the speech recognition engine selects 610 the geographical information relevant to the grammars to be weighted in the particular pass of speech recognition and to the current vehicle location. The relevant geographical information may be selected prior to receiving the geographical information from the map database 802 or may be selected after it is received. For example, for determination of the city name, the selected relevant geographical information may include (i) the distance between the current location and the various cities in the grammar, and (ii) the size (measured by the area of the city), population (measured by the number of people in the city), and the popularity (measured by an index of, e.g., 1 (least popular) through 10 (most popular), indicating how well-known the geographical location is) of the various cities in the grammar. For example, in the case where the current location is the city of Mountain View, the distance between the current location and the various cities in the city name tokens may be D-MLA (distance between Mountain View and Los Angeles), D-MP (distance between Mountain View and Palo Alto, D-MLT (distance between Mountain View and Los Altos), and D-MS (distance between Mountain View and Santa Clara). The size of the cities in the city name tokens may be S-LA (size of Los Angeles), S-P (size of Palo Alto), S-LT (size of Los Altos), S-S (size of Santa Clara). The population of the cities in the city name tokens may be P-LA (population of Los Angeles), P-P (population of Palo Alto), P-LT (population of Los Altos), P-S (population of Santa Clara). The popularity of the cities in the city name tokens may be I-LA (popularity index of Los Angeles), I-P (popularity index of Palo Alto), I-LT (popularity index of Los Altos), I-S (popularity index of Santa Clara).

Then, the weights corresponding to the city name tokens of the grammar are calculated using the information received in steps 604, 606, 608, and 610. The weight for each city name token ("Redwood City," "Palo Alto," "Los Altos," and "Santa Clara") is adjusted based on the current location and the geographical information that was received.

In one embodiment, the weight is increased as the distance from the current location to the location corresponding to the grammar is shorter, and is decreased as the distance from the current location to the location corresponding to the grammar. The weight may vary inversely with the distance between the current location and the location corresponding to the grammar. This is because it is statistically more likely that the user of the speech recognition system may ask for directions to a closer location.

In another embodiment, the weight is increased as the size of the location corresponding to the grammar becomes larger, and is decreased as the size of the location corresponding to the grammar becomes smaller. The weight may vary proportionally with the size of the location corresponding to the grammar. This is because it is statistically more likely that the user of the speech recognition system may ask for directions to a location with a larger size.

In still another embodiment, the weight is increased as the population of the location corresponding to the grammar becomes larger, and is decreased as the population of the location corresponding to the grammar becomes smaller. The weight may vary proportionally with the population of the location corresponding to the grammar. This is because it is statistically more likely that the user of the speech recognition system may ask for directions to a location with a larger population.

In still another embodiment, the weight is increased as the popularity index of the location corresponding to the grammar becomes larger, and is decreased as the popularity index of the location corresponding to the grammar becomes smaller. The weight may vary proportionally with the popularity index of the location corresponding to the grammar. This is because it is statistically more likely that the user of the speech recognition system may ask for directions to a location that is more popular or familiar.

For example, in the case where the current location is the city of Mountain View, the weights $W9$, $W10$, $W11$, and $W12$ for each of the city name tokens "Los Angeles," "Palo Alto," "Los Altos," and "Santa Clara," respectively, may be calculated by:

$W9$ (Los Angeles)=$S\text{-}LA/(D\text{-}MLA+C)$, $W10$ (Palo Alto)=$S\text{-}P/(D\text{-}MP+C)$, $W11$ (Los Altos)=$S\text{-}LT/(D\text{-}MLT+C)$, $W12$ (Santa Clara)=$S\text{-}S/(D\text{-}MS+C)$, where C is a constant larger than zero to prevent the denominator from being zero in case the current vehicle location is the same as the location corresponding to the city name token.

As another example, in the case where the current location is the city of Mountain View, the weights $W9$, $W10$, $W11$, and $W12$ for each of the city name tokens "Los Angeles," "Palo Alto," "Los Altos," and "Santa Clara," respectively, may be calculated by:

$W9$ (Los Angeles)=$P\text{-}LA/(D\text{-}MLA+C)$, $W10$ (Palo Alto)=$P\text{-}P/(D\text{-}MP+C)$, $W11$ (Los Altos)=$P\text{-}LT/(D\text{-}MLT+C)$, $W12$ (Santa Clara)=$P\text{-}S/(D\text{-}MS+C)$, where C is a constant larger than zero to prevent the denominator from being zero in case the current location is the same as the location corresponding to the city name token.

As still another example, in the case where the current location is the city of Mountain View, the weights $W9$, $W10$, $W11$, and $W12$ for each of the city name tokens "Los Angeles," "Palo Alto," "Los Altos," and "Santa Clara," respectively, may be calculated by:

$W9$ (Los Angeles)=$(S\text{-}LA+P\text{-}LA)/(D\text{-}MLA+C)$, $W10$ (Palo Alto)=$(S\text{-}P+P\text{-}P)/(D\text{-}MP+C)$, $W11$ (Los Altos)=$(S\text{-}LT+P\text{-}LT)/(D\text{-}MLT+C)$, $W12$ (Santa Clara)=$(S\text{-}S+P\text{-}S)/(D\text{-}MS+C)$, where C is a constant larger than zero to prevent the denominator from being zero in case the current vehicle location is the same as the location corresponding to the city name token.

As still another example, in the case where the current location is the city of Mountain View, the weights $W9$, $W10$, $W11$, and $W12$ for each of the city name tokens "Los Angeles," "Palo Alto," "Los Altos," and "Santa Clara," respectively, may be calculated by:

$W9$ (Los Angeles)=$(S\text{-}LA+P\text{-}LA+I\text{-}LA)/(D\text{-}MLA+C)$, $W10$ (Palo Alto)=$(S\text{-}P+P\text{-}P+I\text{-}P)/(D\text{-}MP+C)$, $W11$ (Los Altos)=$(S\text{-}LT+P\text{-}LT+I\text{-}LT)/(D\text{-}MLT+C)$, $W12$ (Santa Clara)=$(S\text{-}S+P\text{-}S+I\text{-}S)/(D\text{-}MS+C)$, where C is a constant larger than zero to prevent the denominator from being zero in case the current vehicle location is the same as the location corresponding to the city name token. The weighted grammar is provided 614 to the speech recognition engine to be used in speech recognition, as will be described with reference to FIG. 7.

The formulae described above for calculating the weights for the tokens in the grammar are mere examples, and other formulae may be used to calculate such weights based on various geographical information, to the extent that the weights indicate the appropriate increase or decrease of the probability of correct speech recognition resulting from the particular type of geographical information.

Figure 7:
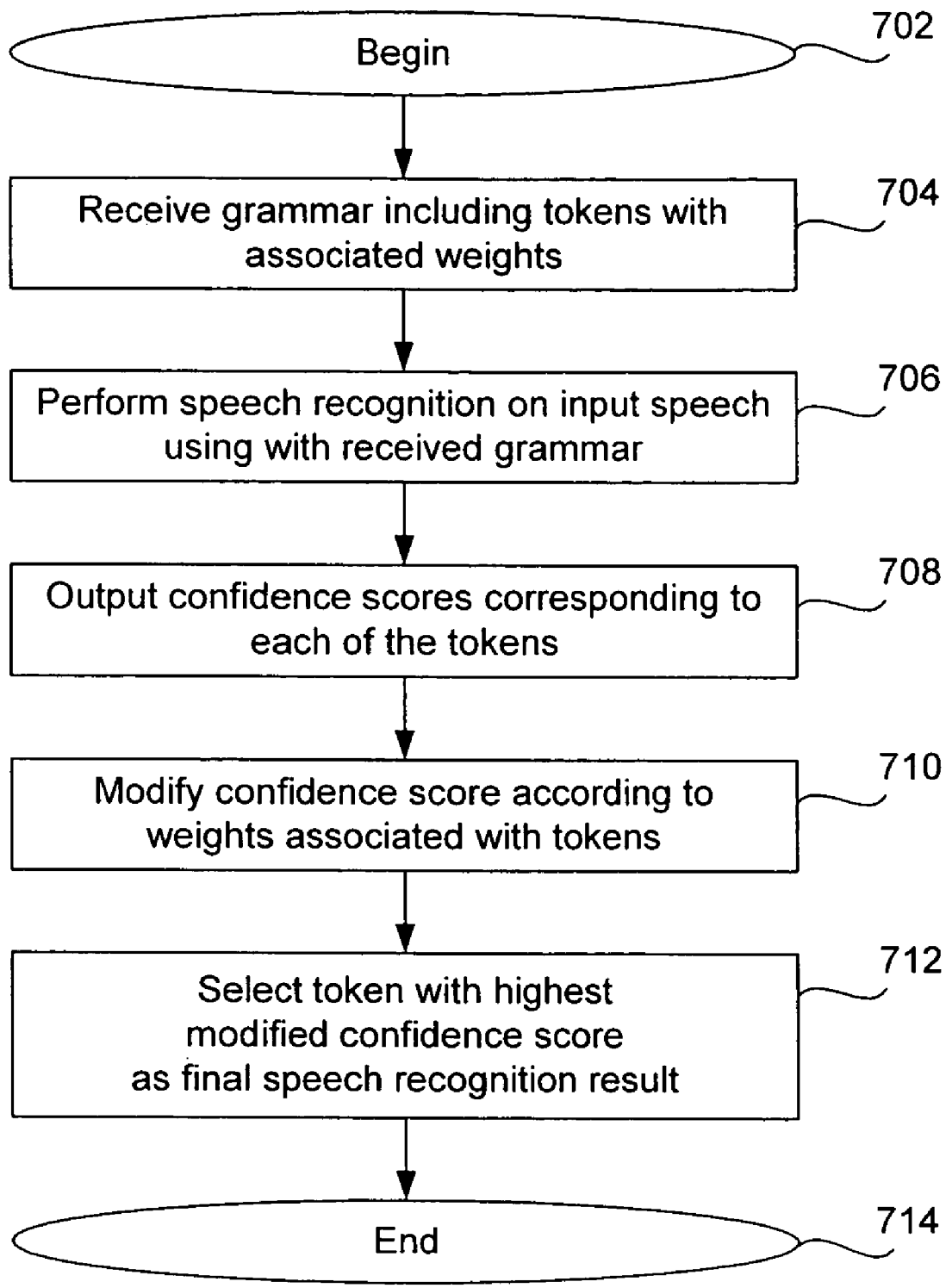
FIG. 7 is a flowchart illustrating a method of performing speech recognition using weighted grammar, according to one embodiment of the present invention.

FIG. 7 is a flowchart illustrating a method of performing speech recognition using weighted grammar, according to one embodiment of the present invention. The tokens in the grammar were weighted based on geographical information associated with the location of the vehicle according to the method described in, e.g., FIG. 6. The method of FIG. 7 is performed in a speech recognition engine coupled to a grammar generator performing the method of providing weighted grammar of FIG. 6.

As the process begins 702, the speech recognition engine receives 704 the grammars including tokens with their associated weights. For example, in the case where the current location is Mountain View, the speech recognition engine may receive the city name tokens "Los Angeles," "Palo Alto," "Los Altos," and "Santa Clara," with their associated weights $W9$, $W10$, $W11$, and $W12$, respectively. Then, the speech recognition engine performs 706 speech recognition on the input speech (addresses) by comparing the acoustic characteristics of the input speech signal with each of the city name tokens "Los Angeles," "Palo Alto," "Los Altos," and "Santa Clara." As a result of the speech recognition 706, the speech recognition engine outputs 708 confidence scores for each of the city name tokens in the grammar, indicating how close the input speech (address)

signal is to each of the city name tokens. The higher the confidence score is, the closer the input speech signal is to the city name token associated with the confidence score. For example, the speech recognition engine may output confidence scores C1, C2, C3, C4 for the city name tokens "Los Angeles," "Palo Alto," "Los Altos," and "Santa Clara."

The confidence scores are further modified 710 according to the weights associated with each of the city name tokens. For example, the confidence scores C1, C2, C3, C4 may be modified by the weights W9, W10, W11, and W12, respectively, to generate modified confidence scores MC1, MC2, MC3, and MC4 corresponding to the city name tokens "Los Angeles," "Palo Alto," "Los Altos," and "Santa Clara," respectively. In one embodiment, the modified confidence scores are obtained by multiplying the confidence scores with the corresponding weights, i.e., $MCi=Ci*Wi$ ($i=1, 2, 3, \ldots$). Then, the city name token with the highest modified confidence score (MCi) is selected 712 as the final speech recognition result, and the process ends 714.

The weights W9, W10, W11, W12 derived from location-based information enhance the accuracy of speech recognition. For example, a user may intend to say "Los Altos" but the user's input speech may be vague and sound more like "Los Aldes." The speech recognition engine may determine that "Los Aldes" is closer to "Los Angeles" than it is to "Los Altos" and output a confidence score C1 (e.g., 80) for "Los Angeles" that is higher than the confidence score C3 (e.g., 70) for "Los Altos." However, if the vehicle's current location is Mountain View, Calif., then the weight W9 (e.g., 0.5) associated with "Los Angeles" may be much smaller than the weight W11 (e.g., 0.9) associated with "Los Altos," because the distance D-MLA between Mountain View and Los Angeles is much farther than the distance D-MLT between Mountain View and Los Altos. Thus, the modified confidence score MC1 (C1*W9) for "Los Angeles" would be 40 (80*0.5) while the modified confidence score MC3 (C3*W11) for "Los Altos" would be 63 (70*0.9). Therefore, the speech recognition engine selects "Los Altos" rather than "Los Angeles" as the final speech recognition result, thereby enhancing the accuracy of speech recognition notwithstanding the vague input speech signal from the user.

Figure 8:
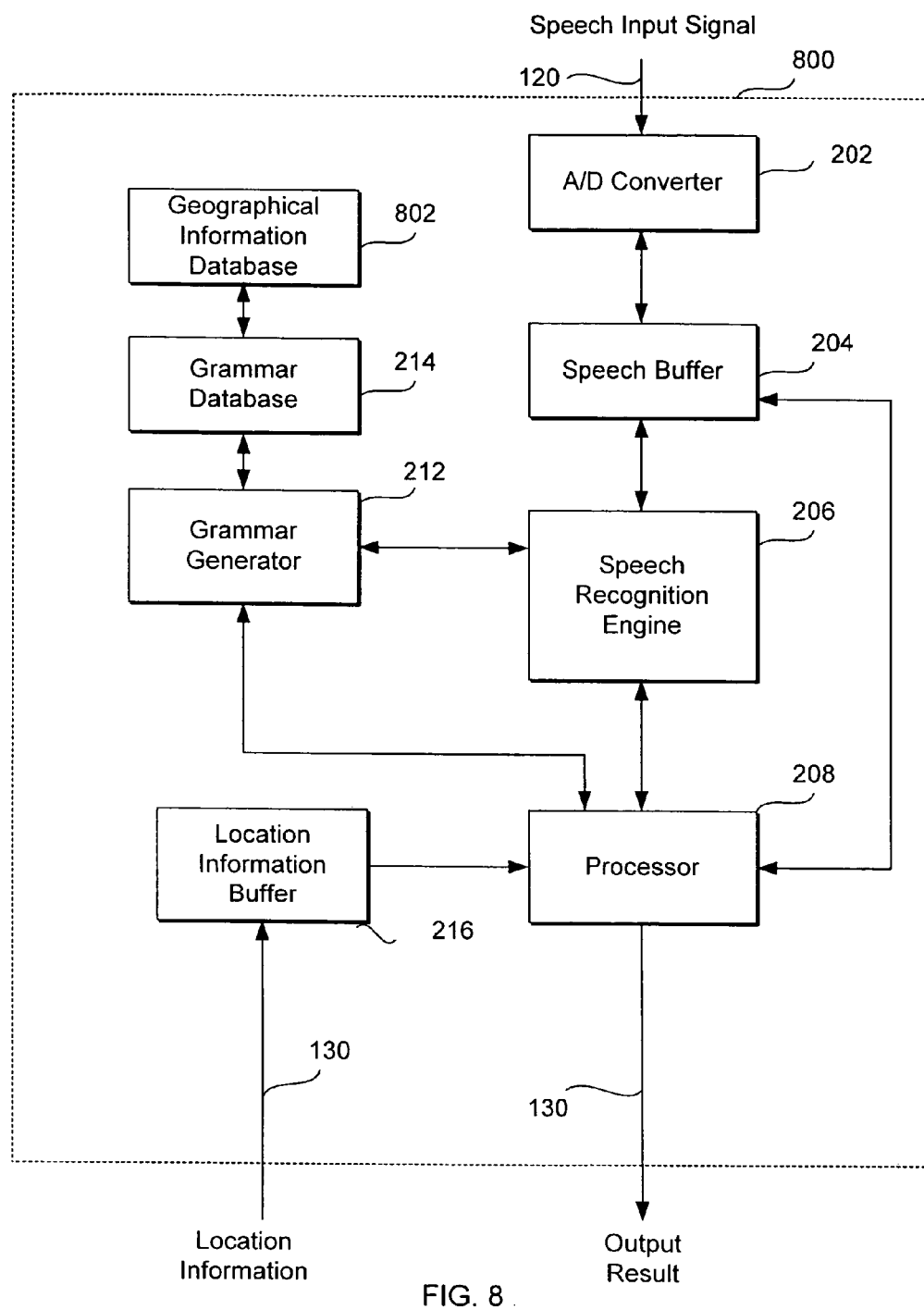
FIG. 8 is a block diagram illustrating a speech recognition system that utilizes weighted grammar for speech recognition, according to one embodiment of the present invention.

FIG. 8 is a block diagram illustrating a speech recognition system 800 for providing and utilizing grammar weighted based upon geographical information, according to one embodiment of the present invention. The speech recognition system 800 is identical to the speech recognition system 104a described in FIG. 2A, except that it further includes a geographical information database 802 and that the grammar database 214, the grammar generator 212, and the speech recognition engine 206 are capable of providing and utilizing grammar weighted based upon geographical information, as described in FIGS. 5-7. The geographical information database 802 stores various geographical information and provides such geographical information to the grammar generator 212 via the grammar database 214. The grammar generator 212 generates grammars along with their associated weights, as described in FIG. 6, based upon the geographical information received from the geographical information database 802, the grammars provided by the grammar database 214, and the current location information provided by the location information buffer 216 via the processor 208. The speech recognition engine 206 performs speech recognition on the input speech signal 120, using the weighted grammar provided by the grammar generator 212 as described in FIG. 7.

Figure 9:
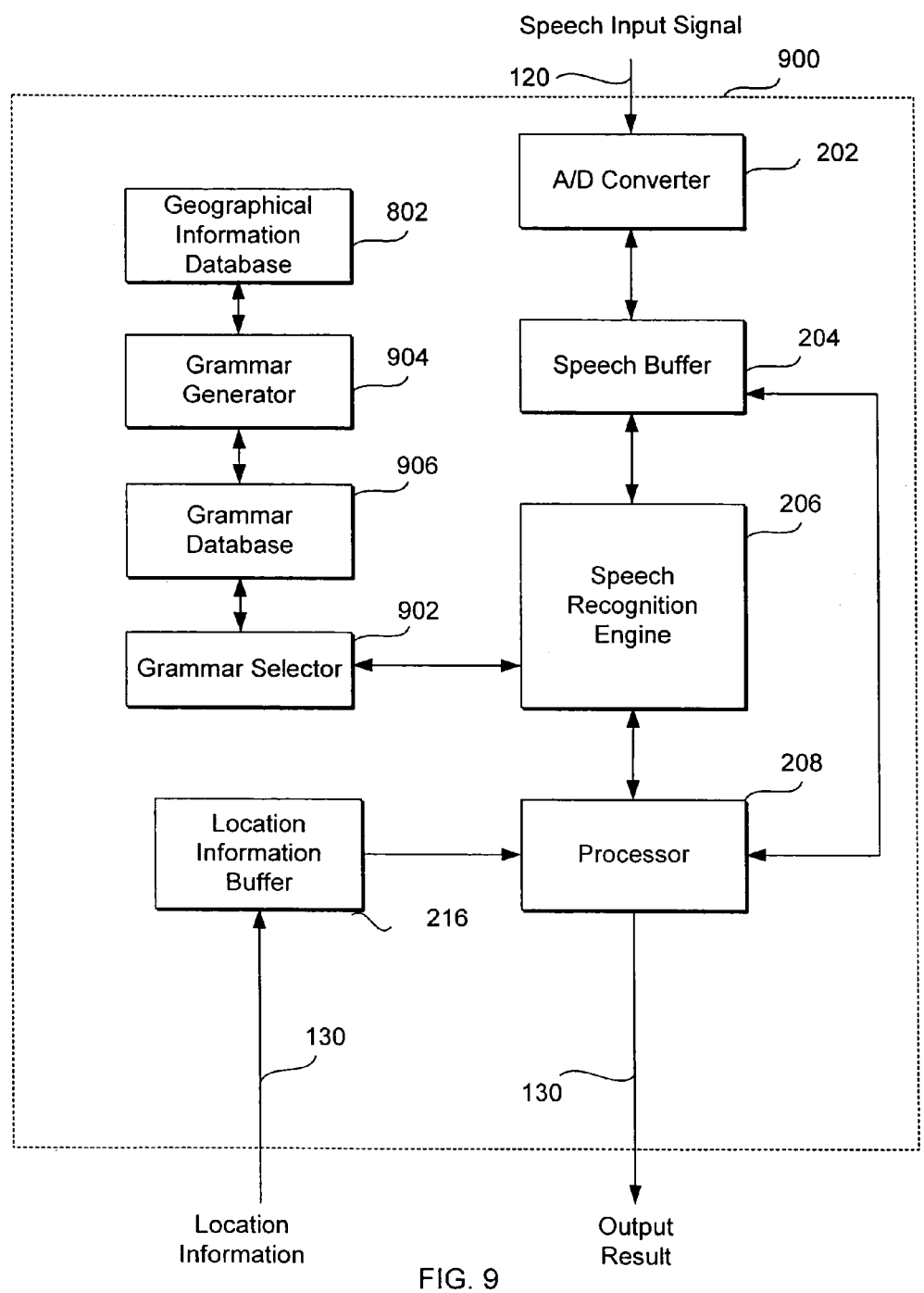
FIG. 9 is a block diagram illustrating a speech recognition system for providing and utilizing grammar weighted based upon geographical information, according to another embodiment of the present invention.

FIG. 9 is a block diagram illustrating a speech recognition system 900 for providing and utilizing grammar weighted based upon geographical information, according to another embodiment of the present invention. The speech recognition system 900 is identical to the speech recognition system 800 of FIG. 8, except that the weights corresponding to the various tokens of the grammar are pre-calculated and pre-stored by the grammar generator 904 and grammar database 906. When the current location of the vehicle is determined, the appropriate tokens and corresponding weights are selected.

Referring to FIG. 9, the grammar generator 904 generates grammar and weights corresponding to the various tokens in the grammar based upon the geographical information received from the geographical information database 802. The weights are pre-calculated for various combinations of current locations and tokens with tokens (city names) assumed as the current vehicle location. The grammar and the weights are stored in the grammar database 906. Once the current location of the vehicle is determined by the location information in the location information buffer, the grammar selector 902 selects at runtime the appropriate tokens and their associated weights based upon the current location. Since the weights are pre-calculated and stored in the grammar database along with their corresponding tokens, the speech recognition system 900 does not have to calculate the weights in real time when the speech recognition is being carried out, thus saving processing time.

Although the present invention has been described above with respect to several embodiments, various modifications can be made within the scope of the present invention. For example, the two or three pass speech recognition method described in FIGS. 3 and 4A-4C may be modified to include even more passes. To this end, the grammar in each pass of the multiple pass speech recognition method may attempt to recognize smaller parts of the speech such that the entire speech will be recognized in smaller parts and thus in more passes. Each grammar corresponding to each passes in the multiple pass speech recognition method may correspond to a different level in the knowledge hierarchy. The number of passes (two or three) described herein with regard to the multiple pass speech recognition system of the present invention does not limit the scope of the invention.

Furthermore, the methods described in FIGS. 3, 4A-4C, and 6-7 can be embodied in software stored in a computer readable medium or in hardware having logic circuitry configured to perform the method described therein. The division of intelligence between the client device and the server in a networked speech recognition system illustrated in FIG. 2C can be modified in any practically appropriate manner.

The generation and use of weighted grammar as described in FIGS. 5-9 may be used with speech recognition utilizing any number of passes of the present invention, including single pass speech recognition. In addition, the present invention may also be used for weighting language models in an SLM (Statistical Language Model) speech recognition system, where the language models may also be considered tokens.

The method and system of weighting grammar based upon location information prior to providing the grammar to the speech recognition engine, as described in FIGS. 5-9, have several advantages over modifying the speech recognition results output by a speech recognition engine based upon the location information during or subsequent to the speech recognition, e.g., as described in step 418 of FIG. 4B and step 438 of FIG. 4C:

First, the speech recognizer of the present invention can appropriately combine the weights that were pre-calculated based upon location information with the search for the tokens acoustically similar to the received speech. Each speech recognition engine from each vendor typically has different methods of searching for tokens acoustically similar to the received speech. For a complex grammar, for example a street address, the search space is very large. A lot of temporary information is saved during the search for tokens acoustically similar to the received speech. Each path within the search space involves processing time. It is much more appropriate and more efficient to combine the pre-calculated weights at the time of the search, not after all of the searching has been completed, because the temporary results generated during the search will be unavailable after the search is completed.

Second, the speed of speech recognition according to the present invention as described in FIGS. 5-9 is much faster than modifying the speech recognition results based upon location information during or subsequent to the speech recognition process itself, e.g., as described in step 418 of FIG. 4B and step 438 of FIG. 4C, because the weights corresponding to the tokens of the grammar may be pre-calculated and stored and do not have to be calculated at run-time during the speech recognition process.

Third, the generation of weighted grammar according to the present invention as described in FIGS. 5-9 may be carried out independently from a particular speech recognition engine. The weighted grammar of the present invention may be used with a variety of different types of commercially available speech recognition engines, without any modifications to those speech recognition engines in order to use the location information, as long as they use a similar grammar format (Grammar Specification Language). For example, a closely related grammar format has been accepted by the W3C (which standardize voicexml and html formats), so any voicexml standard speech recognition engine may use the weights based upon location information according to the present invention.

Fourth, the weighted grammar according to the present invention enables a client-server architecture. For example, the location information may be obtained at the client device (vehicle navigation system) and the speech recognition may be performed at a server coupled to the client device via a wireless communication network. The client device may send the received speech and the GPS information to the server, and the server may select the appropriate weighted grammar (tokens) based upon the location information. In addition, the generation of weighted grammar based upon location information may be separated from the speech recognition engine, thus enabling a modular speech recognition system. For example, the generation of weighted grammar based upon location information may be carried out in a vehicle navigation system (client device) and the speech recognition based upon the weighted grammar may be carried out in a server coupled to the vehicle navigation system via a wireless communication network.

Accordingly, the disclosure of the present invention is intended to be illustrative, but not limiting, of the scope of the invention, which is set forth in the following claims.

What is claimed is:

1. A method of providing weighted grammars for speech recognition in a vehicle navigation system, the method comprising:
receiving grammar for speech recognition, the grammar including a plurality of tokens;
receiving geographical information corresponding to the tokens;
receiving location information indicating the location of a vehicle for which the vehicle navigation system is used;
calculating weights corresponding to the tokens based upon the location information and the geographical information,
wherein the geographical information includes distances between the vehicle location and locations corresponding to the tokens and the size of the locations corresponding to the tokens, and the weight (W) associated with each of the tokens is calculated by:

$$W=SG/(Dcg+C),$$

where SG is the size of the location corresponding to the token, Dcg is the distance from the vehicle location to the location corresponding to the token, and C is a predetermined constant.

2. The method of claim 1, further comprising:
comparing input speech with the tokens;
generating confidence scores corresponding to the tokens based upon the comparison; and
modifying the confidence scores based upon the weights associated with the tokens.

3. The method of claim 2, wherein modifying the confidence scores comprises multiplying the confidence scores by their associated weights.

4. A method of providing weighted grammars for speech recognition in a vehicle navigation system, the method comprising:
receiving grammar for speech recognition, the grammar including a plurality of tokens;
receiving geographical information corresponding to the tokens;
receiving location information indicating the location of a vehicle for which the vehicle navigation system is used;
calculating weights corresponding to the tokens based upon the location information and the geographical information,
wherein the geographical information includes distances between the vehicle location and locations corresponding to the tokens and the population of the locations corresponding to the tokens, and the weight (W) associated with each of the tokens is calculated by:

$$W=PG/(Dcg+C),$$

where PG is the population of the location corresponding to the token, Dcg is the distance from the vehicle location to the location corresponding to the token, and C is a predetermined constant.

5. A method of providing weighted grammars for speech recognition in a vehicle navigation system, the method comprising:
receiving grammar for speech recognition, the grammar including a plurality of tokens;
receiving geographical information corresponding to the tokens;
receiving location information indicating the location of a vehicle for which the vehicle navigation system is used;
calculating weights corresponding to the tokens based upon the location information and the geographical information,
wherein the geographical information includes distances between the vehicle location and locations corresponding to the tokens and the size and population of the locations corresponding to the tokens, and the weight (W) associated with each of the tokens is calculated by:

$$W=(SG+PG)/(Dcg+C),$$

where SG is the size of the location corresponding to the token, PG is the population of the location corresponding to the token, Dcg is the distance from the vehicle location to the location corresponding to the token, and C is a predetermined constant.

6. A method of providing weighted grammars for speech recognition in a vehicle navigation system, the method comprising:
  receiving grammar for speech recognition, the grammar including a plurality of tokens;
  receiving geographical information corresponding to the tokens;
  receiving location information indicating the location of a vehicle for which the vehicle navigation system is used;
  calculating weights corresponding to the tokens based upon the location information and the geographical information,
  wherein the geographical information includes distances between the vehicle location and locations corresponding to the tokens and the size, population, and the popularity indices of the locations corresponding to the tokens, and the weight (W) associated with each of the tokens is calculated by:

$$W=(SG+PG+IG)/(Dcg+C),$$

where SG is the size of the location corresponding to the token, PG is the population of the location corresponding to the token, IG is the popularity index of the location corresponding to the tokens, Dcg is the distance from the vehicle location to the location corresponding to the token, and C is a predetermined constant.

7. A speech recognition system for use in a vehicle navigation system, the speech recognition system comprising:
  a grammar database storing grammars including tokens corresponding to parts of addresses;
  a geographical information database storing geographical information corresponding to the tokens; and
  a grammar generator selecting one or more of the tokens and assigning weights to the selected tokens, the weights being determined based upon the geographical information and the location of a vehicle for which the vehicle navigation system is used,
  wherein the geographical information includes distances between the vehicle location and locations corresponding to the tokens and the size of the locations corresponding to the tokens, and the weight (W) assigned to each of the tokens is calculated by:

$$W=SG/(Dcg+C),$$

where SG is the size of the location corresponding to the token, Dcg is the distance from the vehicle location to the location corresponding to the token, and C is a predetermined constant larger than zero.

8. A speech recognition system for use in a vehicle navigation system, the speech recognition system comprising:
  a grammar database storing grammars including tokens corresponding to parts of addresses;
  a geographical information database storing geographical information corresponding to the tokens; and
  a grammar generator selecting one or more of the tokens and assigning weights to the selected tokens, the weights being determined based upon the geographical information and the location of a vehicle for which the vehicle navigation system is used,
  wherein the geographical information includes distances between the vehicle location and locations corresponding to the tokens and the population of the locations corresponding to the tokens, and the weight (W) assigned to each of the tokens is calculated by:

$$W=PG/(Dcg+C),$$

where PG is the population of the location corresponding to the token, Dcg is the distance from the vehicle location to the location corresponding to the token, and C is a predetermined constant larger than zero.

9. A speech recognition system for use in a vehicle navigation system, the speech recognition system comprising:
  a grammar database storing grammars including tokens corresponding to parts of addresses;
  a geographical information database storing geographical information corresponding to the tokens; and
  a grammar generator selecting one or more of the tokens and assigning weights to the selected tokens, the weights being determined based upon the geographical information and the location of a vehicle for which the vehicle navigation system is used,
  wherein the geographical information includes distances between the vehicle location and locations corresponding to the tokens and the size and population of the locations corresponding to the tokens, and the weight (W) assigned to each of the tokens is calculated by:

$$W=(SG+PG)/(Dcg+C),$$

where SG is the size of the location corresponding to the token, PG is the population of the location corresponding to the token, Dcg is the distance from the vehicle location to the location corresponding to the token, and C is a predetermined constant larger than zero.

10. A speech recognition system for use in a vehicle navigation system, the speech recognition system comprising:
  a grammar database storing grammars including tokens corresponding to parts of addresses;
  a geographical information database storing geographical information corresponding to the tokens; and
  a grammar generator selecting one or more of the tokens and assigning weights to the selected tokens, the weights being determined based upon the geographical information and the location of a vehicle for which the vehicle navigation system is used,
  wherein the geographical information includes distances between the vehicle location and locations corresponding to the tokens and the size, population, and the popularity indices of the locations corresponding to the tokens, and the weight (W) assigned to each of the tokens is calculated by:

$$W=(SG+PG+IG)/(Dcg+C),$$

where SG is the size of the location corresponding to the token, PG is the population of the location corresponding to the token, IG is the popularity index of the location corresponding to the token, Dcg is the distance from the vehicle location to the location corresponding to the token, and C is a predetermined constant larger than zero.

11. The speech recognition system of claim 7, further comprising:
  a speech recognition engine comparing input speech with the tokens and generating confidence scores corresponding to the tokens based upon comparison, the speech recognition engine modifying the confidence scores based upon the assigned weights.

12. The speech recognition system of claim 11, wherein the speech recognition engine modifies the confidence scores by multiplying the confidence scores with the assigned weights.

* * * * *